United States Patent [19]

Tsutsui et al.

[11] Patent Number: 5,649,880

[45] Date of Patent: Jul. 22, 1997

[54] FAILSAFE CONTROL SYSTEM FOR AUTOMATIC TRANSMISSION

[75] Inventors: Hiroshi Tsutsui, Nishio; Kazumasa Tsukamoto, Toyota; Masahiro Hayabuchi; Masaaki Nishida, both of Anjo; Yoshihisa Yamamoto, Nishio, all of Japan

[73] Assignee: Aisin AW Co., Ltd., Japan

[21] Appl. No.: 580,105

[22] Filed: Dec. 22, 1995

[30] Foreign Application Priority Data

Dec. 27, 1994 [JP] Japan ..................... 6-326266

[51] Int. Cl.$^6$ ................... F16H 61/20; F16H 59/30; B60K 41/02
[52] U.S. Cl. ................ 477/125; 477/175; 477/109; 477/80; 477/906
[58] Field of Search ................. 477/79, 80, 90, 477/91, 107, 109, 125, 130, 156, 166, 174, 175, 906

[56] References Cited

U.S. PATENT DOCUMENTS

| 4,653,622 | 3/1987 | Miyake .................... 477/73 |
| 4,850,251 | 7/1989 | Kuwayama ............... 477/114 |

*Primary Examiner*—Khoi Q. Ta
*Attorney, Agent, or Firm*—Lorusso & Loud

[57] ABSTRACT

A control system for control of a clutch interposed between a fluid transmission unit and a speed change unit in a vehicular automatic transmission. The control system includes a first R.P.M. detector for detecting clutch input side R.P.M. and a second R.P.M. detector for detecting clutch output side R.P.M. A stop state detector determines if the vehicle is at a standstill and a starting operation detector detects a starting operation by the driver. The hydraulic control unit includes a hydraulic servo for applying/releasing the input clutch, a control signal oil pressure generating solenoid valve for generating a control signal oil pressure, a control valve for regulating a forward running range pressure according to the control signal oil pressure to generate a control oil pressure; a change signal oil pressure generating solenoid valve for generating a change signal oil pressure and a change-over valve switchable by the change signal oil pressure, between a first position in which it feeds the forward running range pressure to the hydraulic servo, and a second position in which it feeds the control oil pressure to the hydraulic servo. A failure is decided if the clutch input/output R.P.M. difference is over a set value which is set on the basis of the clutch input/output R.P.M. difference when the starting operation is detected by the starting operation detector. A fail-safe feature causes a shift output to a higher speed gear stage, over-riding a control signal from the pressure booster, when a failure is decided, to output the change signal to the solenoid of the control signal oil pressure solenoid valve to thereby bring the change-over valve into the first position.

10 Claims, 26 Drawing Sheets

FIG. 3

| | SOLENOID | | | CLUTCH | | | BRAKE | | | | ONE-WAY CLUTCH | | |
|---|---|---|---|---|---|---|---|---|---|---|---|---|---|
| | S1 | S2 | S3 | C1 | C2 | C3 | B1 | B2 | B3 | B4 | F1 | F2 | F3 |
| R | × | ○ | × | × | ○ | × | × | × | ○ | ○ | × | × | × |
| N | × | ○ | × | × | × | × | × | × | × | ○ | × | × | × |
| D 1ST | × | ○ | △ | ○ | × | × | × | × | (○) | ○ | × | ○ | ○ |
| D 2ND | ○ | ○ | △ | ○ | × | × | ○ | ○ | × | ○ | ○ | × | ○ |
| D 3RD | ○ | × | × | ○ | × | ○ | ○ | ○ | × | × | ○ | × | × |
| D 4TH | × | × | × | ○ | ○ | ○ | × | ○ | × | × | × | × | × | ing
FAILSAFE CONTROL SYSTEM FOR AUTOMATIC TRANSMISSION

BACKGROUND OF THE INVENTION

1. Field of the Invention

The present invention relates to a control system for an automatic transmission.

2. Related Art

In the automatic transmission of the prior art, the torque generated by the engine is transmitted through a fluid transmission unit, such as a torque converter, to a speed change unit. Between the fluid transmission unit and the speed change unit, is arranged a first clutch acting as an input clutch, which can be applied/released for change between neutral and a forward running range.

In such an automatic transmission, when the range is changed from neutral to forward running (hereinafter "N-D change") by operation of a speed selector such as a shift lever, the N-D change can controlled with smooth application of the first clutch by gradually boosting the oil pressure of the hydraulic servo of the first clutch. Moreover, when the forward running range is selected with the vehicle at a stop, a neutral control can bring the first clutch into a predetermined released state by reducing the oil pressure of the hydraulic servo of the first clutch (as disclosed in U.S. Pat. No. 4,850,251). For this purpose, the hydraulic control system has a control valve, responsive to a signal pressure, for generating a control oil pressure and has a change-over valve for selectively feeding either the control oil pressure or a line pressure (also referred to as "forward running range pressure") to the hydraulic servo. For control of the hydraulic servo, the control system for the automatic transmission switches the change-over valve to connect the control valve and the hydraulic servo to thereby feed the control oil pressure from the control valve to the hydraulic servo. As a result, the first clutch can be placed in a predetermined engaging state corresponding to the control oil pressure. Moreover, the control system switches the change-over valve, when the oil pressure of the hydraulic servo need not be controlled, to feed the line pressure (or "forward running range pressure") to the hydraulic servo. As a result, the first clutch can be brought into the engaged state.

In such a hydraulic control unit, if, for some reason, the control oil pressure is not produced by the control valve the result is a failed state. In this case, the change-over valve can be switched to feed the line pressure to the hydraulic servo to thereby apply the first clutch. Thus, the control system has a fail-safe feature for releasing the N-D control or the neutral control so that the first clutch can be applied to start the vehicle, where a failure occurs when the vehicle is to be started during the N-D change control or neutral control.

However, in the above-described control system a shift shock may occur as the first clutch is applied. For example, a state of failure may be decided by the timing operation of a guard timer. In case the vehicle is to be started during the N-D change control, the timing operation of the guard timer is started when a N-D change is indicated by operation of the shift selector. If the engagement of the first clutch is not ended by expiration of the timed period, it is decided that a failure has occurred.

On the other hand, in case the vehicle is to be started during neutral control, the driver will remove his foot from the brake pedal and depress the accelerator pedal. When these starting operations are performed, the timing operation by the guard timer is started. If the engagement of the first clutch is not completed by the end of the timing period, it is decided that a failure has occurred.

When the accelerator pedal is depressed simultaneously with the N-D change, for the purpose of starting the vehicle moving during the N-D change control, the engine R.P.M. rises by the time it is decided that a failure has occurred. As a result, engaging shock will occur if, responsive to a decision that a failure has occurred, the N-D change control is released to apply the first clutch.

Likewise, if the accelerator pedal is depressed simultaneously with release of the brake pedal so as to start the vehicle moving during neutral control, the engine R.P.M. rises by the time the occurrence of a failure is decided. As a result, an engaging shock will occur, if the occurrence of a failure is decided and the neutral control is accordingly released to apply the first clutch.

SUMMARY OF THE INVENTION

Accordingly, an object of the present invention is to provide a control system for an automatic transmission, which control system prevents engaging shock in response to a decision that a failure has occurred, when the vehicle is to be started during the N-D change control or the neutral control.

According to one aspect of the present invention, therefore, there is provided a control system for an automatic transmission, including a fluid transmission unit for receiving torque from the engine and a speed change unit including an input clutch applied when a forward running range is selected, so that the rotational output of the fluid transmission unit is input to the speed change unit when the input clutch is applied. The control system further includes a hydraulic control unit for establishing a plurality of gear stages in the speed change unit, a first R.P.M. detection means for detecting clutch input side R.P.M., a second R.P.M. detection means for detecting the clutch output side R.P.M., stop state detection means for detecting that the vehicle is stopped, starting operation detection means for detecting an operation by the driver to start the vehicle moving and a control unit.

The hydraulic control unit includes a hydraulic servo for applying/releasing the input clutch, a control signal oil pressure generating solenoid valve for generating a control signal oil pressure, a control valve for regulating a forward running range pressure according to the control signal oil pressure to generate a control oil pressure, and a change signal oil pressure generating solenoid valve for generating a change signal oil pressure. The hydraulic control unit further includes a changeover valve which is switched by the change signal oil pressure between a first position in which it feeds the forward running range pressure to the hydraulic servo, and a second position in which it feeds the control oil pressure to the hydraulic servo.

The control unit includes shift output generating means for generating shift output signals for establishing the individual gear stages and pressure reducing means for outputting, when the vehicle is determined to be stopped by the stop state detection means, a change signal to the solenoid of the change signal oil pressure generating solenoid valve to bring the changeover valve into the second position, and a control signal to the solenoid of the control signal oil pressure generating solenoid valve to reduce the control oil pressure to thereby bring the input clutch into a predetermined released state. The control unit has pressure boosting means for outputting, when a starting operation is detected by the starting operation detection means, a control signal to the solenoid of the control signal oil pressure generating solenoid valve to boost the control oil pressure to thereby bring the input clutch into a predetermined applied state. When the input clutch comes into a predetermined applied state, the pressure boosting means outputs a change signal to the solenoid of the change signal oil pressure generating solenoid valve to bring the change-over valve into the first position. The control unit also includes fail decision means for deciding a failure if the clutch input/output R.P.M. difference between the R.P.M. of the input side and the R.P.M. of the output side of the input clutch exceeds a set value which is set on the basis of the clutch input/output R.P.M. difference when a starting operation is detected by the starting operation detection means. A fail-safe means causes the shift output generating means to generate a shift output signal to establish a higher speed gear stage, in preference to the control signal from the pressure boosting means (over-ride), when a failure is decided by the fail decision means, and to output a change signal to the solenoid of the control signal oil pressure solenoid valve to thereby bring the change-over valve into the first position.

In a second embodiment of the present invention the control system likewise includes a fluid transmission unit for receiving torque from the engine and a speed change unit including an input clutch applied when a forward running range is selected, so that the rotational output of the fluid transmission unit is input to the speed change unit when the input clutch is applied. As in the first-described embodiment, this second embodiment includes a hydraulic control unit for establishing a plurality of gear stages in the speed change unit, a first R.P.M. detection means for detecting clutch input side R.P.M., a second R.P.M. detection means for detecting the clutch output side R.P.M. of the output side of the input clutch and a control unit. This second embodiment is further provided with a range changing operation detection means for detecting an operation for shift to a forward running range.

The hydraulic control unit of the second embodiment is the same as that of the first embodiment.

On the other hand, in this second embodiment, the control unit includes shift output generating means for generating shift output signals to establish the individual gear stages. Also included is a pressure boosting means for outputting, when a demand for shift to a forward running range is detected by the range changing operation detection means, a change signal to the solenoid of the change signal oil pressure generating solenoid valve to bring the change-over valve into the second position, for then outputting a control signal to the solenoid of the control signal oil pressure generating solenoid valve to boost the control oil pressure to thereby bring the input clutch into a predetermined applied state, and for outputting, when the input clutch comes into the predetermined applied state, a change signal to the solenoid of the change signal oil pressure generating solenoid valve to bring the change-over valve into the first position. Failure decision means decides a failure if the clutch input/output R.P.M. difference between the R.P.M. of the input side and the R.P.M. of the output side of the input clutch exceeds a set value, which value is set on the basis of the clutch input/output R.P.M. difference when the range changing operation is detected by the range changing operation detection means. Fail-safe means is included for causing the shift output generating means to generate a shift output signal for a shift to a higher speed gear stage preferentially of the output of the control signal by the pressure boosting means (over-riding same), when a failure is decided by the fail decision means, to output the change signal to the solenoid of the control signal oil pressure solenoid valve to thereby bring the change-over valve into the first position.

In another preferred embodiment, the control system of the present invention further includes output R.P.M. detection means for detecting the output R.P.M. of the speed change unit, i.e. a third R.P.M. detection means.

The second R.P.M. detection means detects the clutch output side R.P.M. on the basis of the output R.P.M. and the gear ratio of the gear state which is established by the speed change unit.

In yet another embodiment, the control unit further includes engine torque control mean for generating an engine torque control signal, when a failure is decided by the failure decision means, to reduce the torque of the engine at least until the end of the application of the input clutch.

In a further aspect of the present invention, the fail-safe means causes, when a failure is decided by the fail decision means, the shift output generating means to effect a shift to a higher gear stage prior to the output of the control signal by the pressure boosting means, and outputs the change signal, after the shift to the higher gear stage has been completed, to the solenoid of the change signal oil pressure generating solenoid valve to bring the change-over valve into the first position.

In the first embodiment the control unit preferably includes pressure reduction inhibition means for inhibiting the outputs of the change signal and the control signal by the pressure reducing means when a failure is decided by the fail decision means.

In the second embodiment, the control unit preferably includes pressure boost inhibition means for inhibiting the outputs of the change signal and the control signal by the pressure boosting means when a failure is decided by the fail decision means.

In the first embodiment, when the control signal oil pressure generating solenoid valve generates and sends the control signal oil pressure to the control valve, the control valve regulates the forward running range pressure (line pressure), in a manner corresponding to the control signal oil pressure, to generate the control oil pressure. Moreover, when the change signal oil pressure generating solenoid valve generates and sends the change signal oil pressure to the change-over valve, this change-over valve is switched between the first position, in which it feeds the forward running range pressure to the hydraulic servo, and the second position in which it feeds the control oil pressure to the hydraulic servo.

Also in the first embodiment, when the vehicle is determined to be at a standstill by the stop state detection means, the pressure reducing means generates a change signal and a control signal to output the change signal to the solenoid of the change signal oil pressure generating solenoid valve to thereby place the change-over valve in the second position and to output the control signal to the solenoid of the control signal oil pressure generating solenoid valve to thereby reduce the control oil pressure to bring the input clutch into the predetermined released state.

Moreover, when the starting operation is detected by the starting operation detection means, the pressure boosting means outputs the control signal to the solenoid of the control signal oil pressure generating solenoid valve to boost the control oil pressure to thereby bring the input clutch into the predetermined applied state. When the input clutch comes into the predetermined applied state, the pressure boosting means outputs the change signal to the solenoid of the change signal oil pressure generating solenoid valve to thereby place the changeover valve in the first position.

Incidentally, when the vehicle comes to a stop, the control oil pressure is reduced so that the input clutch comes into the predetermined released state. In this state, if a failure occurs in the control valve, the control oil pressure is still low making it difficult to start the vehicle, even if a starting operation is made by the driver. Specifically, when the starting operation is made by the driver, a control signal is output to the solenoid of the control signal oil pressure generating solenoid valve by the pressure boosting means. However, if the control valve is in a state of failure, the control oil pressure could not be boosted without some further provision.

Therefore, a failure is decided only if the clutch input/output R.P.M. difference exceeds a set value which is set on the basis of the clutch input/output R.P.M. difference at the instant when the starting operation is detected by the starting operation detection means.

Where there is no failure and, accordingly, no delay in the engagement of the input clutch, for example, the engagement of the input clutch is started as the control oil pressure rises, so that the clutch input/output R.P.M. difference always decreases.

In the case of a failure, on the contrary, the input clutch is not applied even if the engine R.P.M. is increased by the depression of the accelerator pedal, so that the clutch input/output R.P.M. difference increases.

Therefore, the present clutch input/output R.P.M. difference is compared with the clutch input/output R.P.M. difference at the instant when the starting operation is detected by the starting operation detection means. As a result, the condition in which the input clutch cannot be applied even if the engine R.P.M. rises, can be reliably detected to accurately make the failure decision.

Moreover, if a failure is decided, the fail-safe means causes the shift output generating means to generate an output for a shift to a higher gear stage prior to the output of the control signal by the pressure boosting means, and to output the change signal to the solenoid of the change signal oil pressure generating solenoid valve to thereby place the change-over valve in the first position.

In the above case, the forward running range pressure is fed to the hydraulic servo to apply the input clutch by placing the change-over valve in the first position. However, when output for shift to the higher gear stage is generated, the torque output from the speed change unit is reduced. As a result, it is possible to reduce the engaging shock which is caused when the input clutch is applied.

In the second embodiment, when the control signal oil pressure generating solenoid valve generates and sends the control signal oil pressure to the control valve, the control valve regulates the forward running range pressure in a manner to correspond to the control signal oil pressure to thereby generate the control oil pressure. Moreover, when the change signal oil pressure generating solenoid valve generates and sends the change signal oil pressure to the change-over valve, this change-over valve is switched between the first position in which it feeds the forward running range pressure to the hydraulic servo, and the second position in which it feeds the control oil pressure to the hydraulic servo.

Also in the second embodiment, when the changing operation is detected by the range changing operation detection means, the pressure boosting means outputs the change signal to the solenoid of the change signal oil pressure generating solenoid valve to place the changeover valve in the second position. After this, the range changing operation detection means outputs the control signal to the solenoid of the control signal oil pressure generating solenoid valve to boost the control oil pressure to thereby bring the input clutch into the predetermined applied state. At the same time, when the input clutch comes into the predetermined applied state, the range changing operation detection means outputs the change signal to the solenoid of the change signal oil pressure generating solenoid valve to thereby switch the change-over valve to the first position.

Incidentally, when a failure occurs in the control valve before the operation changing the forward running range, the control oil pressure is still low even if an operation to change the forward running range is made by the driver, thereby making it difficult to start the vehicle. Specifically, when the operation changing the forward running range is made by the driver, the control signal is output to the solenoid of the control signal oil pressure generating solenoid valve by the pressure boosting means. However, a state of failure in the control valve would prevent the control oil pressure from being boosted.

Therefore, in the second embodiment also, the fail decision means determines the fail state only if the clutch input/output R.P.M. difference between the clutch input side R.P.M. and the clutch output side R.P.M. exceeds a set value which is set on the basis of the clutch input/output R.P.M. difference at the instant when the range changing operation is detected by the range changing operation detection means. Moreover, if a failure is decided, the fail-safe means causes the shift output generating means to generate the output for shift to a higher gear stage prior to the output of the control signal by the pressure boosting means, to thereby output the change signal to the solenoid of the change signal oil pressure generating solenoid valve and to thereby place the change-over valve in the first position. In this case, the forward running range pressure is fed to the hydraulic servo-to apply the input clutch by placing the change-over valve in the first position. However, because the shift output to the higher gear stage is generated, the torque output from the speed change unit is reduced. As a result, it is possible to reduce the engaging shock which is caused when the input clutch is applied.

The control system for the automatic transmission, according to still another aspect of the present invention, further comprises output R.P.M. detection means for detecting the output R.P.M. of the speed change unit. Because the second R.P.M. detection means detects the clutch output side R.P.M. on the basis of the output R.P.M. and the gear ratio of the gear state which is achieved by the speed change unit, in this case, the clutch output side R.P.M. sensor can be deleted in favor of the output R.P.M. detection means arranged at the output side of the speed change unit.

In another aspect of the present invention, the control unit further includes engine torque control mean for generating an engine torque control signal, when a failure is decided by the fail decision means, to reduce the torque of the engine at least until the end of the application of the input clutch. In this case, the torque of the engine is reduced at least until the end of the application of the input clutch, so that the torque output from the speed change unit can be further reduced to further reduce the engaging shock which will occur when the input clutch is applied.

As previously noted, in one embodiment of the present invention, the fail-safe means causes, when a failure is decided by the fail decision means, the shift output generating means to generate an output for shift to a higher gear stage prior to the output of the control signal by the pressure boosting means, and, after the shift to the higher gear stage has been achieved, outputs a change signal to the solenoid of the change signal oil pressure generating solenoid valve to bring the change-over valve into the first position. In this case, the change signal is not output to the solenoid of the change signal oil pressure generating solenoid valve until completion of the shift to the higher gear stage so that the change-over valve is placed in the second position. In the meanwhile, therefore, the forward running range pressure is not fed to the hydraulic servo so that the input clutch is not applied. As a result, it is possible to reliably reduce the engaging shock which is caused when the input clutch is applied during a fail state.

In the control system for an automatic transmission according to a further aspect of the present invention, the control unit further includes pressure reduction inhibition means for inhibiting the outputs of the change signal and the control signal by the pressure reducing means when a failure is decided, i.e. a fail state established, by the fail decision means. In this case, the outputs of the change signal and the control signal by the pressure reducing means are inhibited so that the neutral control is not executed later. As a result, it is possible to reliably reduce the engaging shock which is caused when the input clutch is applied.

In the control system for an automatic transmission according to a further aspect of the present invention, the control unit further includes pressure boost inhibition means for inhibiting the outputs of the change signal and the control signal by the pressure boosting means when a failure is decided by the fail decision means. In this case, the outputs of the change signal and the control signal by the pressure boosting means are inhibited so that the N-D control is not executed later. As a result, it is possible to reliably reduce the engaging shock which is caused when the input clutch is applied in a fail state.

BRIEF DESCRIPTION OF THE DRAWINGS

FIG. 3 is a table of the operations of an automatic transmission operating under control of the control system of the present invention;

DESCRIPTION OF THE PREFERRED EMBODIMENTS

The present invention will now be described in detail with reference to the accompanying drawings.

Figure 1:
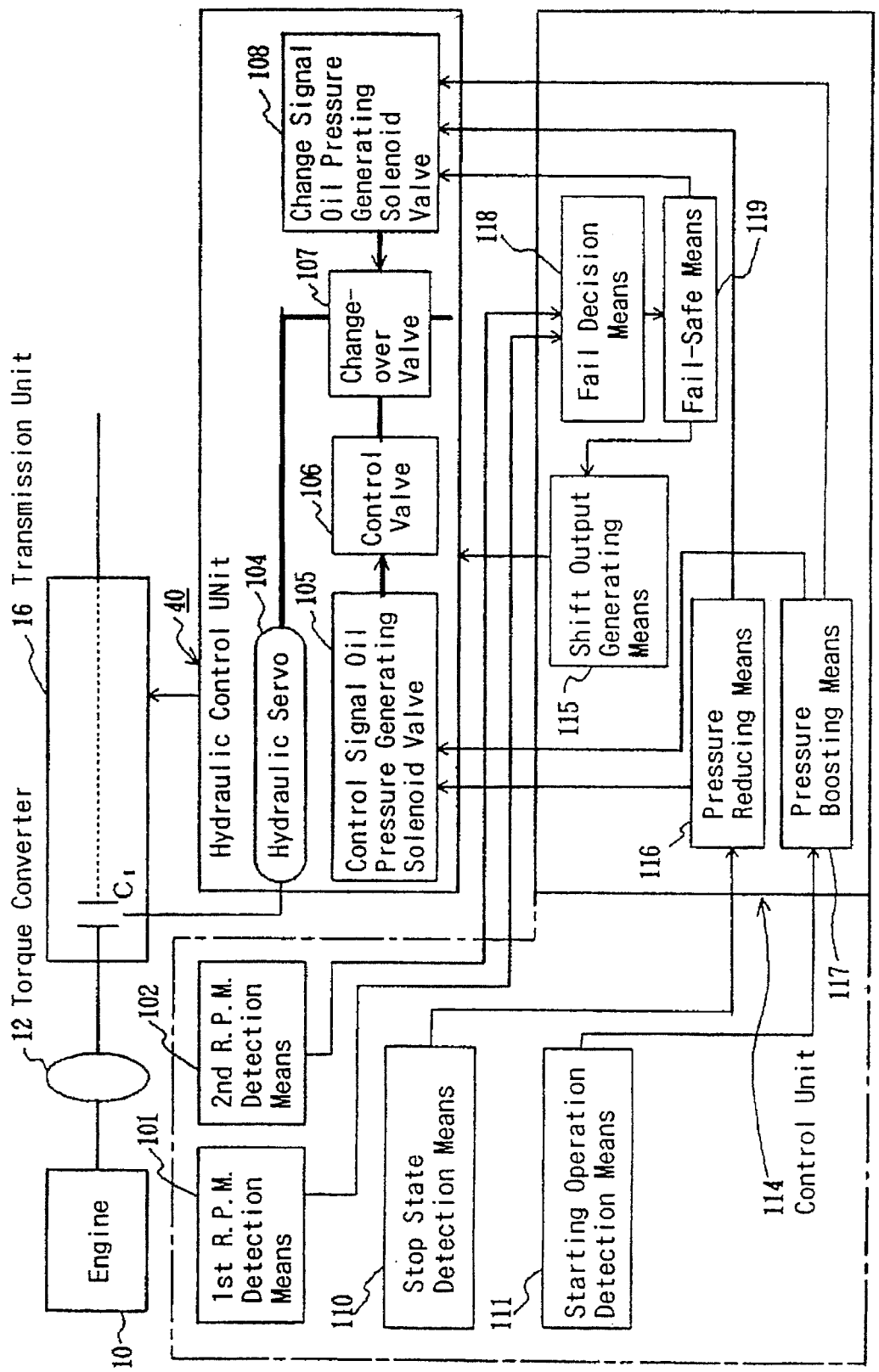
FIG. 1 is a block diagram of a control system according to one embodiment of the present invention.

As shown in FIG. 1, a torque converter 12, serving as a fluid transmission unit, receives rotation from the engine 10. A speed change unit 16 which is equipped with an input clutch $C_I$, applied when a forward running range is selected, for transfer of the rotation of the torque converter 12 to the speed change unit 16. Hydraulic control unit 40 provides for achieving any of a plurality of gear stages in the speed change unit 16. First R.P.M. detection means 101 detects the R.P.M. of the input side of the input clutch $C_I$ and second R.P.M. detection means 102 detects the R.P.M. of the output side of the input clutch $C_I$. Numeral 110 designates stop state detection means for detecting the stop state of a vehicle, numeral 111 designates starting operation detection means for detecting a starting operation by the driver and numeral 114 designates a control unit.

The hydraulic control unit 40 includes a hydraulic servo 104 for applying/releasing the input clutch $C_I$, a control signal oil pressure generating solenoid valve 105 for generating a control signal oil pressure, a control valve 106 for regulating a forward running range pressure according to the control signal oil pressure to generate a control oil pressure, a change signal oil pressure generating solenoid valve 108 for generating a change signal oil pressure and a change-over valve 107 switchable between first and second positions by said change signal oil pressure. In the first position, the change-over valve 107 feeds the forward running range pressure to the hydraulic servo 104 and in the second position it feeds the control oil pressure to the hydraulic servo 104.

The control unit 114 includes shift output signal generating means 115 for generating a shift output signal for establishing a particular gear stage, pressure reducing means 116, pressure boosting means 117, fail decision means 118 and fail-safe means 119. When the vehicle is determined to be stopped by the stop state detection means 110, pressure reducing means 116 outputs a change signal to the solenoid of the change signal oil pressure generating solenoid valve 108 to bring the change-over valve 107 into the second position, and a control signal to the solenoid of the control signal oil pressure generating solenoid valve 105 to reduce the control oil pressure to thereby bring the input clutch $C_I$ into a predetermined state of release. When a starting operation by the driver is detected by the starting operation detection means 111, the pressure boosting means 117 outputs a control signal to the solenoid of the control signal oil pressure generating solenoid valve 105 to boost the control oil pressure to thereby bring the input clutch $C_I$ into a predetermined applied state, and, when said input clutch $C_I$ comes into a predetermined applied state, outputs a change signal to the solenoid of the change signal oil pressure generating solenoid valve 108 to bring the change-over valve 107 into the first position. Fail decision means 118 decides a failure if the clutch input/output R.P.M. difference exceeds a set value which is set on the basis of the clutch input/output R.P.M. difference when the starting operation is detected by the starting operation detection means 111. Fail-safe means 119 causes the shift output generating means 115 to generate a shift output signal for a shift to a higher speed gear stage, this shift output signal over-riding a control signal from the pressure boosting means, when a failure is decided by the fail decision means 118. When a failure is decided the fail-safe means 119 also outputs a change signal to the solenoid of the control signal oil pressure solenoid valve 108 to thereby switch the change-over valve 107 to the first position.

Figure 2:
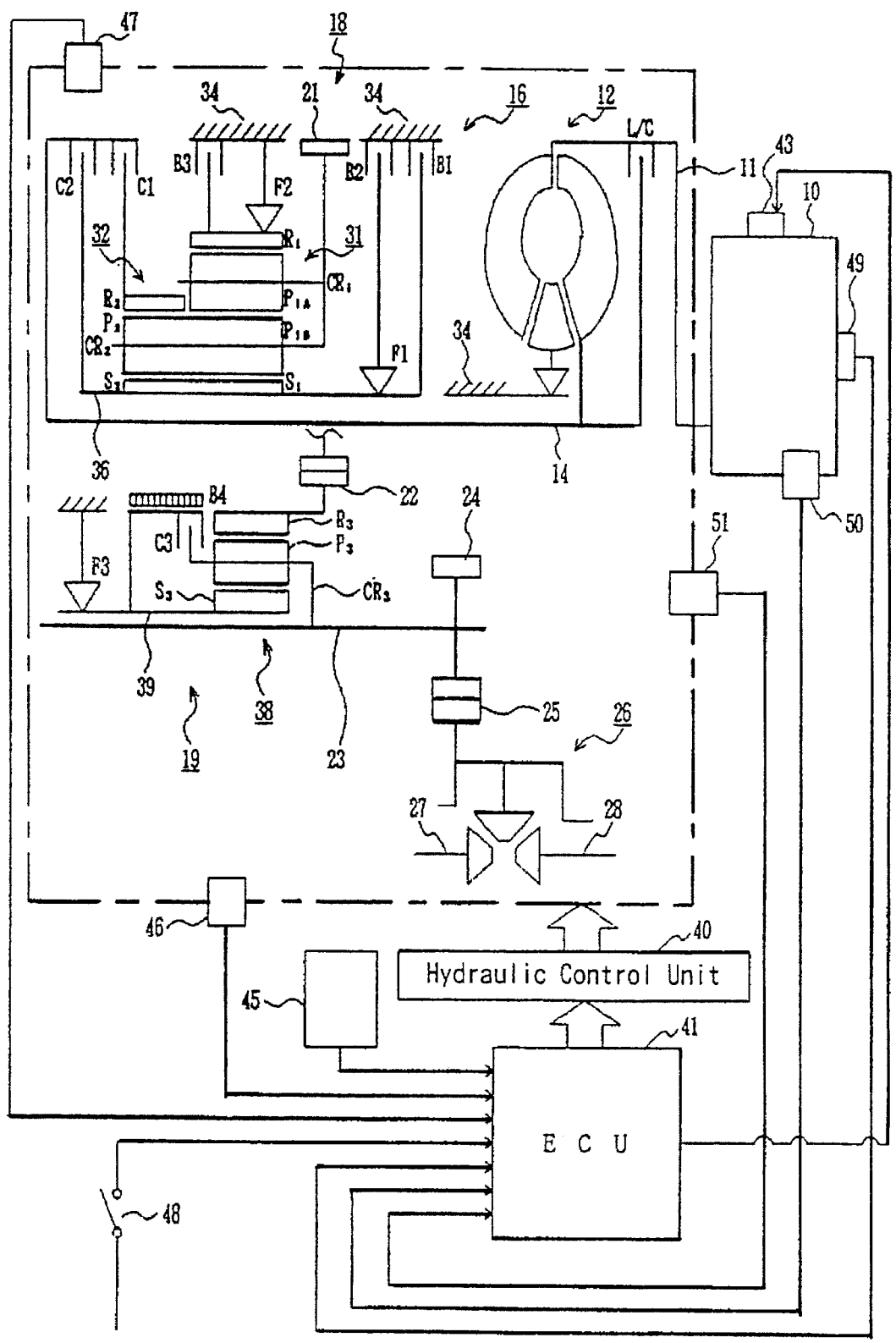
FIG. 2 is a schematic diagram of an automatic transmission equipped with the control system of the present invention.

FIG. 2 is a schematic diagram of an automatic transmission adaptable to control by the control system of the present invention. As shown in FIG. 2, the rotation of engine 10 is transmitted through an output shaft 11 to the torque converter 12. This torque converter 12 transmits the rotation of the engine 10 to an output shaft 14 through a fluid (or working oil). However, if the vehicle speed exceeds a set value, a lockup clutch L/C is applied so that the rotation of the engine can be transmitted directly to the output shaft 14.

Output shaft 14 serves as an input shaft for the speed change unit 16. This speed change unit 16 is constructed of a main transmission 18 for effecting three forward and one reverse gear stages, and an underdrive auxiliary transmission 19. The rotation of the main transmission 18 is transmitted through a counter drive gear 21 and a counter driven gear 22 to the auxiliary transmission 19, the output shaft 23 of which has its rotation transmitted through an output gear 24 and a ring gear 25 to a differential unit 26.

In differential unit 26, the rotation, as received through the output gear 24 and the ring gear 25, is differentiated so that the differential rotations are transmitted through left and right drive shafts 27 and 28 to the not-shown drive wheels.

The main transmission 18 is equipped with a first planetary gear unit 31, a second planetary gear unit 32, a first clutch C1, a second clutch C2, a first brake B1, a second brake B2, a third brake B3, a one-way clutch F1 and a one-way clutch F2 for transmitting the received torque selectively, between the individual components of the two planetary gear units 31 and 32. Incidentally, the first clutch C1 corresponds to the input clutch $C_I$ of FIG. 1.

The first planetary gear unit 31 is composed of: a ring gear $R_1$ connected to a drive unit case 34 through the third brake B3 and the one-way clutch F2, arranged in parallel with each other; a sun gear S formed on a sun gear shaft 36 fitted over and rotatably supported by the output shaft 14; a carrier $CR_1$ connected to the counter drive gear 21; and pinions $P_{1A}$ and $P_{1B}$ interposed to mesh with each other between the ring gear $R_1$ and the sun gear $S_1$ and rotatably supported by the carrier $CR_1$.

The sun gear 36 is connected through the second clutch C2 to the output shaft 14. This sun gear 36 is further connected through the first brake B1 to the drive unit case 34 and through the one-way clutch F1 and the second brake B2, arranged in series with each other, to the drive unit case 34.

The second planetary gear unit 32 is composed of: a ring gear $R_2$ connected through the first clutch C1 to the output shaft 14; a sun gear $S_2$ formed on the sun gear shaft 36 integrally with the sun gear $S_1$; a carrier $CR_2$ connected to the carrier $CR_1$; and a pinion $P_2$ interposed to mesh with the ring gear $R_2$ and the sun gear $S_2$, rotatably supported by the carrier $CR_2$ and formed integrally with the pinion $P_{1B}$.

The counter drive gear 21 is in meshing engagement with the counter driven gear 22 located in the auxiliary transmission 19 to transmit rotation, at the speed established by the main transmission 18, to the auxiliary transmission 19.

The auxiliary transmission 19 is composed of a third planetary gear unit 38, a third clutch C3, a fourth brake B4 and a one-way clutch F3 for transmitting the received torque selectively between the individual components of the third planetary gear unit 38.

The third planetary gear unit 38 is composed of: a ring gear $R_3$ connected to the counter driven gear 22; a sun gear $S_3$ formed on a sun gear shaft 39 rotatably fitted on the output shaft 23; a carrier $CR_3$ fixed on the output shaft 23; and a pinion $P_3$ interposed to mesh with the ring gear $R_3$ and the sun gear $S_3$ and rotatably supported by the carrier $CR_3$.

The operations of the automatic transmission of FIG. 2 will now be described with reference to FIG. 3 wherein: S1—the first solenoid valve; S2—the second solenoid valve; S3—the third solenoid valve acting as the control signal oil pressure generating solenoid valve 108 (FIG. 1); C1—the first clutch; C2—the second clutch; C3—the third clutch; B1—the first brake; B2—the second brake; B3—the third brake; B4—the fourth brake; and F1 to F3—the one-way clutches. Moreover: R—an R-range; N—a neutral range (as will be called the "N-range"); D—a forward running range (as will be called the "Drange"); 1ST—a gear stage at the 1st speed; 2ND—a gear stage at the 2nd speed; 3RD—a gear stage at the 3rd speed; and 4TH—a gear stage at the 4th speed.

Further, symbols O indicate: that a first solenoid signal $S_1$, a second solenoid signal $S_2$ and a third solenoid signal $S_3$ for opening/closing the first solenoid valve S1, the second solenoid valve S2 and the third solenoid valve S3, respectively, are ON; that the first clutch C1, the second clutch C2, the third clutch C3, the first brake B1, the second brake B2, the third brake B3 and the fourth brake B4 are applied; and that the one-way clutches F1 to F3 are locked.

On the other hand, symbols X indicate: that the first solenoid signal $S_1$, the second solenoid signal $S_2$ and the third solenoid signal $S_3$ for opening/closing the first solenoid valve S1, the second solenoid valve S2 and the third solenoid valve S3, respectively, are OFF; that the first clutch C1, the second clutch C2, the third clutch C3, the first brake B1, the second brake B2, the third brake B3 and the fourth brake B4 are released; and that the one-way clutches F1 to F3 are free.

Symbols Δ indicate the ON/OFF when the neutral control state is established, and a parenthesized circle (o) indicates that the third brake B3 is applied during engine braking.

At the 1st speed in the D-range, the first clutch C1 and the fourth brake B4 are applied to lock the one-way clutches F2 and F3. Then, the rotation of the output shaft 14 is transmitted through the first clutch C1 to the ring gear $R_2$. In this state, the rotation of the ring gear $R_1$ is blocked by the one-way clutch F2 so that the rotation of the carrier $CR_2$ is drastically decelerated, while rotating the sun gear $S_2$ idly, and is transmitted to the counter drive gear 21.

The rotation, as transmitted from the counter drive gear 21 to the counter driven gear 22, is further transmitted to the ring gear $R_3$. However, the rotation of the sun gear $S_3$ is blocked by the fourth brake B4 so that the rotation of the carrier $CR_3$ is further decelerated and transmitted to the output shaft 23.

At the 2nd speed in the D-range, on the other hand, the first clutch C1, the first brake B1, the second brake B2 and the fourth brake B4 are applied to lock the one-way clutches F1 and F3. Then, the rotation of the output shaft 14 is transmitted through the first clutch C1 to the ring gear $R_2$, and the rotation of the sun gear $S_2$ is blocked by the second brake B2 and the one-way clutch F1. As a result, the rotation of the ring gear $R_2$ is decelerated and transmitted to the carrier CR2, the rotation of which is transmitted to the counter drive gear 21 while rotating the ring gear $R_1$ idly.

The rotation, as transmitted from the counter drive gear 21 to the counter driven gear 22, is transmitted to the ring gear $R_3$. However, the rotation of the sun gear $S_3$ is blocked by the fourth brake B4 so that the rotation of the carrier $CR_3$ is decelerated and transmitted to the output shaft 23.

At the 3rd speed in the D-range, the first clutch C1, the third clutch C3, the first brake B1 and the second brake B2 are applied to lock the one-way clutch F1. Then, the rotation of the output shaft 14 is transmitted through the first clutch C1 to the ring gear $R_2$, and the rotation of the sun gear $S_2$ is blocked by the second brake B2 and the one-way clutch F1. As a result, the rotation of the ring gear $R_2$ is decelerated and transmitted to the carrier $CR_2$ SO that the rotation of the carrier $CR_2$ is transmitted to the counter drive gear 21 while rotating the ring gear $R_1$ idly.

The rotation, as transmitted from the counter drive gear 21 to the counter driven gear 22, is further transmitted to the ring gear R3. However, the relative rotations of the carrier $CR_3$ and the sun gear $S_3$ are blocked by the third clutch C3 so that the third planetary gear unit 38 comes into a directly connected state. As a result, the rotation of the counter driven gear 22 is transmitted as is to the output shaft 23.

At the 4th speed in the D-range, the first clutch C1, the second clutch C2, the third clutch C3 and the second brake B2 are applied. Then, the rotation of the output shaft 14 is transmitted through the first clutch C1 to the ring gear $R_2$ and through the second clutch C2 to the sun gear $S_2$ so that the first planetary gear unit 31 and the second planetary gear unit 32 come into the directly connected state. As a result, the rotation of the output shaft 11 is transmitted as is to the counter drive gear 21.

The rotation, as transmitted from the counter drive gear 21 to the counter driven gear 22, is further transmitted to the ring gear $R_3$. However, the relative rotations of the carrier $CR_3$ and the sun gear $S_3$ are blocked by the third clutch C3 so that the third planetary gear unit 38 comes into the directly connected state. As a result, the rotation of the counter driven gear 22 is transmitted as is to the output shaft 23.

The automatic transmission 16 is controlled by hydraulic control unit 40 for applying/releasing the first clutch C1, the second clutch C2, the third clutch C3, the first brake B1, the second brake B2, the third brake B3 and the fourth brake B4, to thereby establish one of the individual gear stages. On the other hand, the engine 10 is controlled by an electronic control unit 43. Moreover, both the hydraulic control unit 40 and the electronic control unit 43 are connected to an automatic transmission control unit (ECU) 41 so that they are operated according to the control program of the automatic transmission control unit 41.

The automatic transmission control unit 41 receives input signals from a neutral start switch (N.S.S.W.) 45, an oil temperature sensor 46, an R.P.M. sensor 47, a brake switch 48, an engine R.P.M. sensor 49, a throttle opening sensor 50 and a vehicle speed sensor 51 acting as the output R.P.M. detecting means. Incidentally, the R.P.M. sensor 47 corresponds to the first R.P.M. detecting means 101.

Thus, the shift position of the shift lever (not shown), i.e., the selected range, is detected by the neutral start switch 45, the temperature of the oil in the hydraulic control unit 40 is detected by the oil temperature sensor 46 and the R.P.M. of the input side of the first clutch C1, i.e., the R.P.M. of the output shaft 14 (hereinafter "clutch input side R.P.M.") $N_{C1}$ is detected by the R.P.M. sensor 47.

Operation (depression) of the brake pedal (not shown) is detected by the brake switch 48, the engine R.P.M. $N_E$ is detected by the engine R.P.M. sensor 49, the throttle opening θ is detected by the throttle opening sensor 50 and the R.P.M. of the output side of the speed change unit 16 (hereinafter "output R.P.M.") $N_O$, i.e., the vehicle speed, is detected by the vehicle speed sensor 51.

Figure 4:
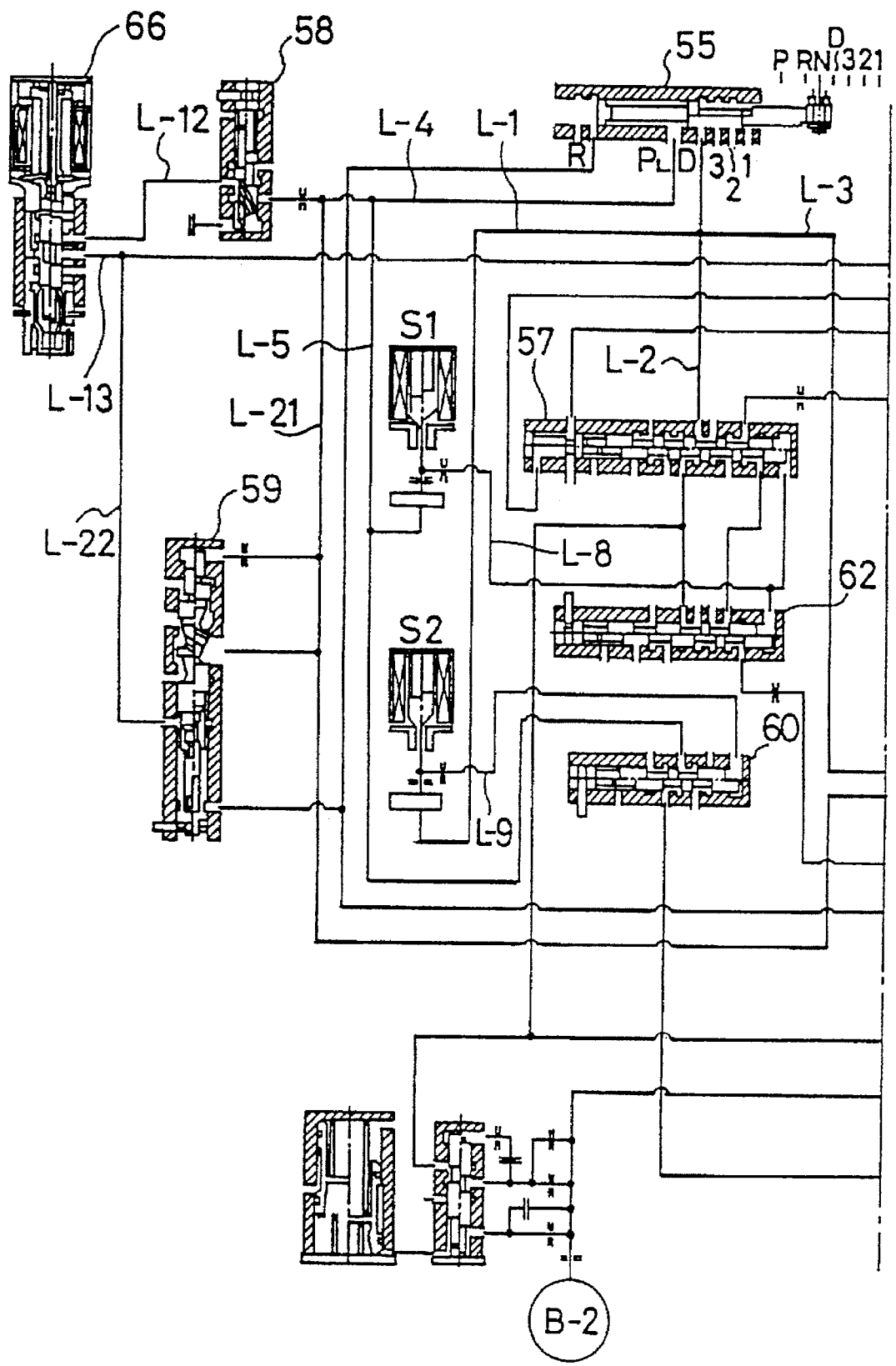
FIG. 4 is a circuit diagram for the hydraulic control unit shown in FIG. 1.
Figure 5:
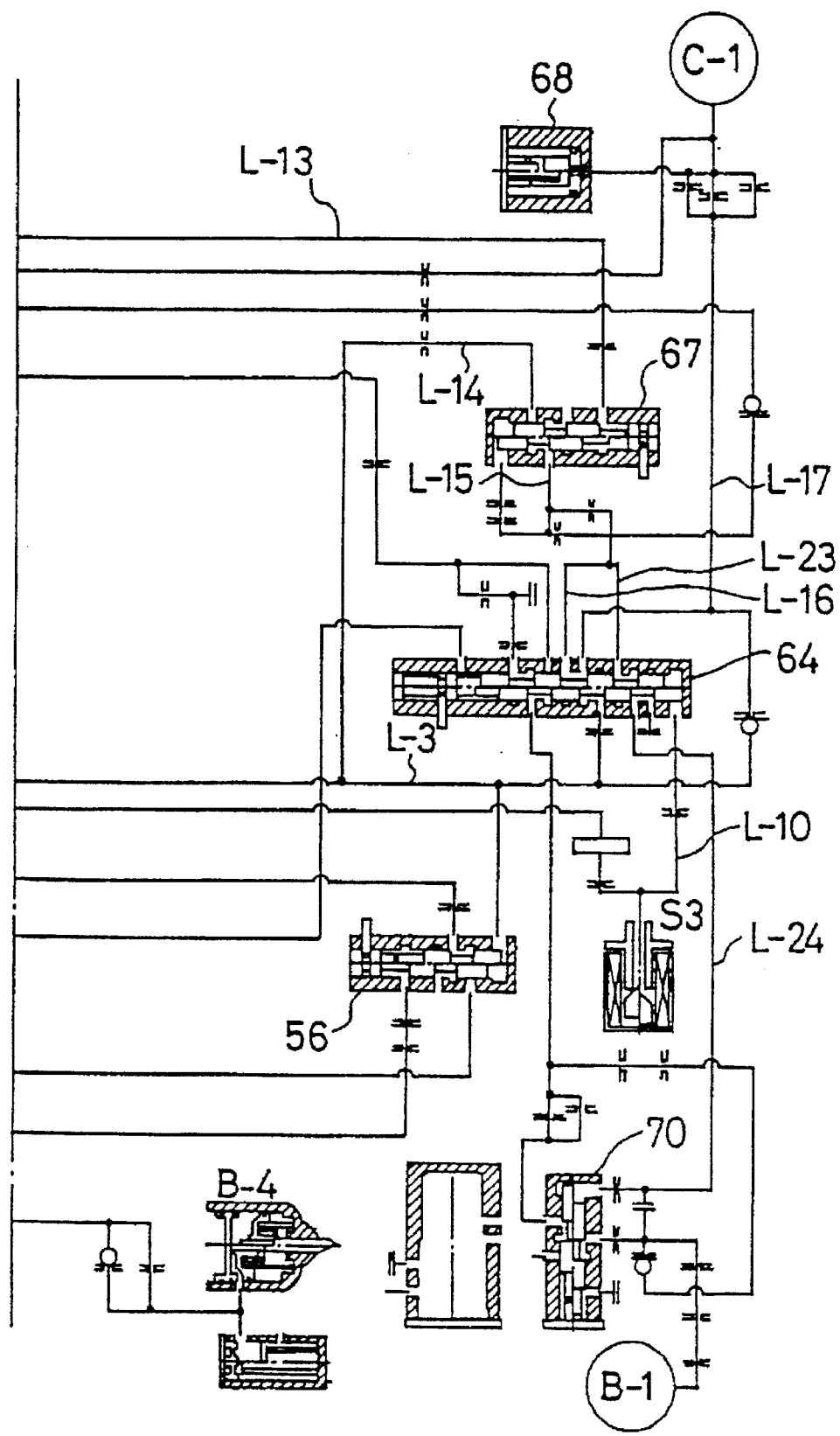
FIG. 5 is a continuation of the hydraulic control circuit diagram of FIG. 4.

As shown in FIGS. 4 and 5, the hydraulic control unit 40 includes a primary valve 59 which adjusts the oil pressure coming from the oil pressure source (not shown) and outputs the adjusted oil pressure as the line pressure to a line L-21. A manual valve 55 is provided with ports 1, 2, 3, D, $P_L$ and R so that the line pressure fed from the primary valve 59 via lines L-21 and L-4 to the port $P_L$ is generated as the 1-range pressure, the 2-range pressure, the 3-range pressure, the forward running range pressure (hereinafter "D-range pressure") and the R-range pressure, respectively, at the ports 1, 2, 3, D and R by operation of the shift lever.

When the shift lever is placed in the forward drive position, the D-range oil pressure, at the port D, is fed via a line L-1 to the second solenoid valve S2, via a line L-2 to a 1-2 shift valve 57 and via a line L-3 to a B-1 sequence valve 56. On the other hand, the line pressure from the primary valve 59 is fed via the line L-21 to the third solenoid valve S3.

Moreover, the line pressure from L-21 is fed via the line L-4 to a solenoid modulator valve 58 and further via a line L-5 to the first solenoid valve S1 and a 2-3 shift valve 60.

The first solenoid signal $S_1$, the second solenoid signal $S_2$ and the third solenoid signal $S_3$, for opening/closing respectively, the first solenoid valve S1, the second solenoid valve S2 and the third solenoid valve S3, are turned ON/OFF in response to the change signals coming from the automatic transmission control system 41 (FIG. 2), so that the first solenoid valve S1 feeds the signal oil pressure via a line L-8 to the 1-2 shift valve 57 and a 3-4 shift valve 62, the second solenoid valve S2 feeds the signal oil pressure via a line L-9 to the 2-3 shift valve 60, and the third solenoid valve S3 feeds the signal oil pressure via a line L-10 to a neutral relay valve 64. Incidentally, the third solenoid valve S3 and the neutral relay valve 64 correspond to the change signal oil pressure generating solenoid valve 108 and the change-over valve 107 of FIG. 1, respectively.

The 1-2 shift valve 57 spool takes the upper half position in 1st speed and the lower half position in the 2nd to 4th speeds. The 2–3 shift valve 60 spool takes the lower half position in 1st and 2nd speeds and the upper half position in 3rd and 4th speeds. The 3-4 shift valve 62 takes the upper half position in the 1st and 4th speeds and the lower half position in the 2nd and 3rd speeds; and the neutral relay valve 64 takes the upper half position in the neutral control state and the lower half position in the 1st to 4th speeds.

The solenoid module valve 58 is connected via a line L-12 to a linear solenoid valve 66, which, in turn, is connected via a line L-13 to a C-1 control valve 67. The linear solenoid valve 66 is further connected via a line L-22 to the primary valve 59. Incidentally, the linear solenoid valve 66 and the C-1 control valve 67 correspond to the control signal oil pressure generating solenoid valve 105 and the control valve 106 of FIG. 1, respectively.

In response to the control signal from the automatic transmission hydraulic control system 41, the linear solenoid valve 66 is controlled to feed a throttle pressure $P_{TH}$ as the control signal oil pressure to the control valve 67 via the line L-13. On the other hand, the C-1 control valve 67 is fed with the D-range pressure via the lines L-3 and L-14 so that it adjusts the received D-range pressure to an oil pressure (hereinafter the "C-1 oil pressure") $P_{C1}$ for the hydraulic servo C-1, in accordance with the throttle pressure $P_{TH}$ coming from the linear solenoid valve 66, and feeds the adjusted oil pressure $P_{C1}$ to a line L-15. Incidentally, the hydraulic servo C-1 corresponds to the hydraulic servo 104 of FIG. 1.

The B-1 sequence valve 56 has a spring located at its left end and a control oil chamber located at its right end. The B-1 sequence valve 56 receives in its control oil chamber the D-range pressure via the line L-3 and assumes the lower half position in 1st speed. When 2nd speed oil pressure is fed to the hydraulic servo B-2, the B-1 sequence valve 56 is fed with the sequence pressure from the hydraulic servo B-2 so that its spool is pushed to the right by the sequence pressure and the spring load to assume the upper half position. As a result, the oil pressure from the 1-2 shift valve 57 is fed through the B-1 sequence valve 56 to the 3-4 shift valve 62 and further through the 1-2 shift valve 57 and the neutral relay valve 64 to a hydraulic servo B-1. Thus, the hydraulic servo B-1 is fed with the oil pressure according to the rise of the oil pressure in the hydraulic servo B-2.

The neutral relay valve 64 takes the upper half position when in the neutral control state. In this neutral control state, therefore, the C-1 oil pressure $P_{C1}$, as generated in the line L-15, is fed through a line L-16, the neutral relay valve 64 and a line L-17 to the hydraulic servo C-1. Moreover, oil at the C-1 oil pressure $P_{C1}$ is fed via lines L-23 and L-24 to a B-1 control valve 70.

The neutral relay valve 64 takes the lower half position at the 1st to 4th speeds. At the 1st to 4th speeds, therefore, the oil at D-range pressure is fed through the line L-3, the neutral relay valve 64 and the line L-17 to the hydraulic servo C-1. In the neutral control state, on the other hand, the neutral relay valve 64 is switched to the upper half position to connect the line L-16 and the line L-17.

Incidentally, a damper valve 68 is provided in the line L-17 for smoothing the discharge of the oil from the hydraulic servo C-1, and B-4 is the hydraulic servo which operates the fourth brake B4.

Next will be described the operations of the automatic transmission control unit at the time of a N-D change.

When the ignition of the engine 10 (FIG. 2) is turned ON, the main control routine (FIG. 6) is started to repeat the N-D change control and the neutral control until the ignition is turned OFF. Thus, in step S1 the N-D change control is executed and in step S2 the neutral control is executed.

Figure 6:
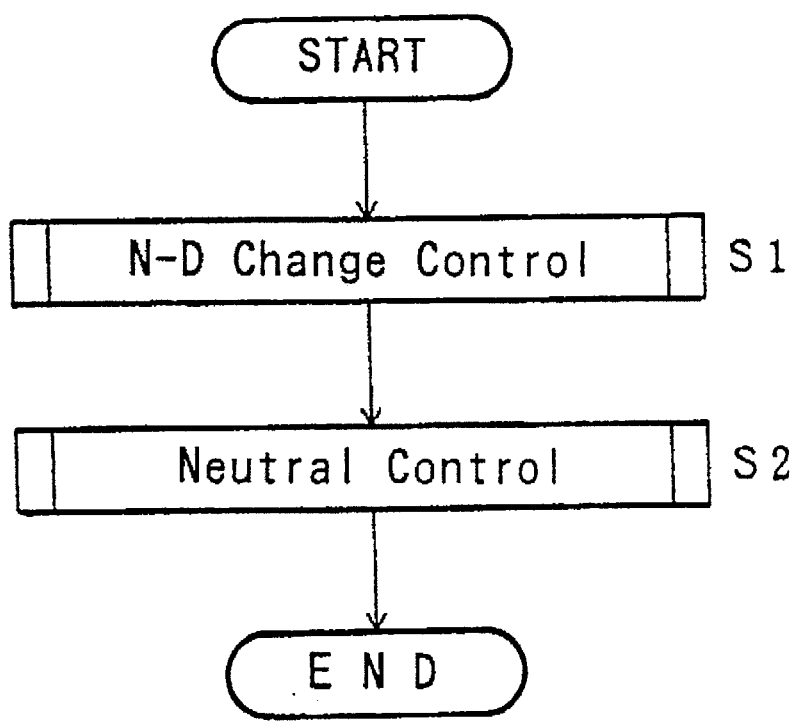
FIG. 6 is a main flow chart showing the operations of the automatic transmission control unit according to the present invention.
Figure 7:
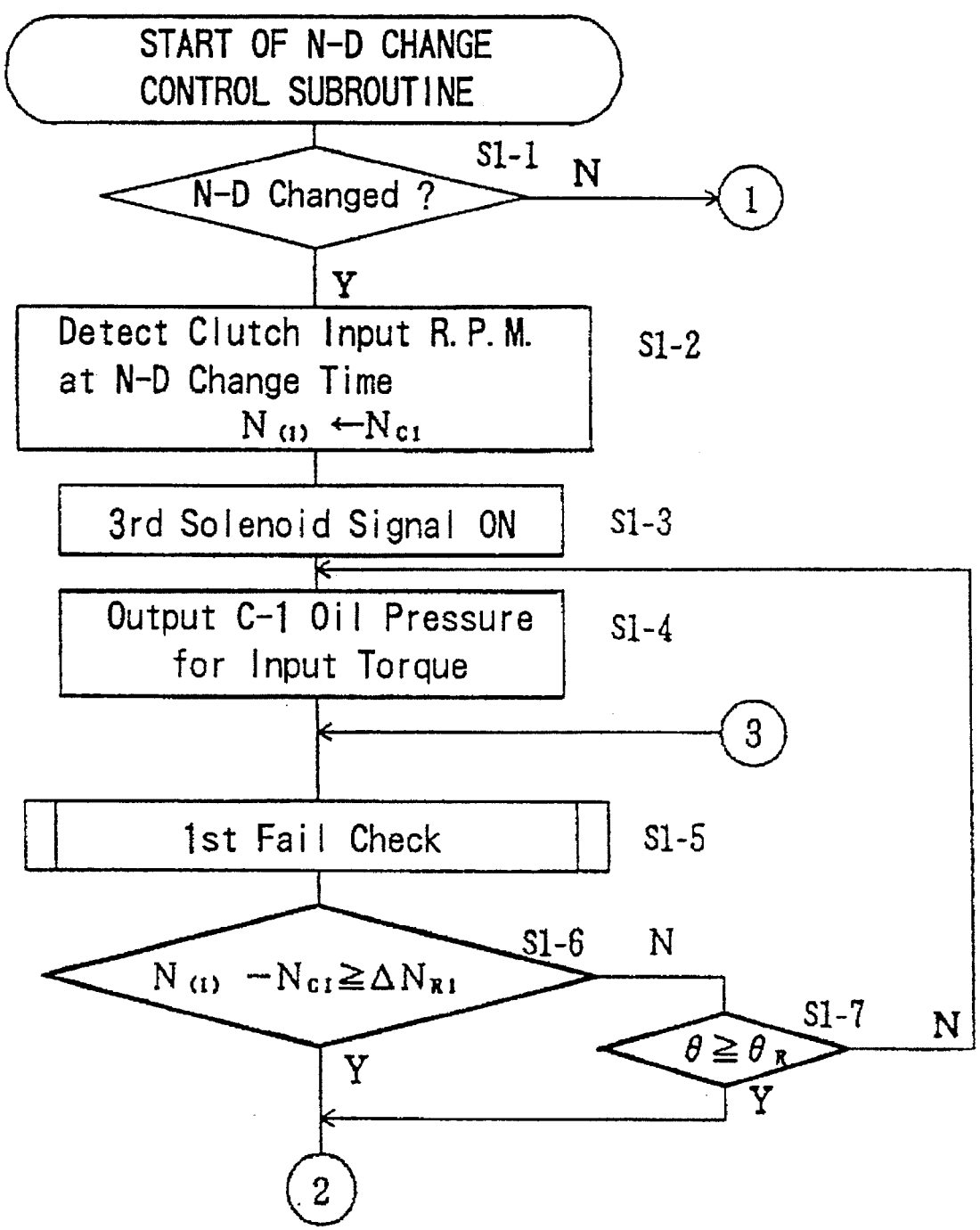
FIG. 7 is a flow chart of the N-D change control subroutine shown as step S1 in FIG. 6.
Figure 8:
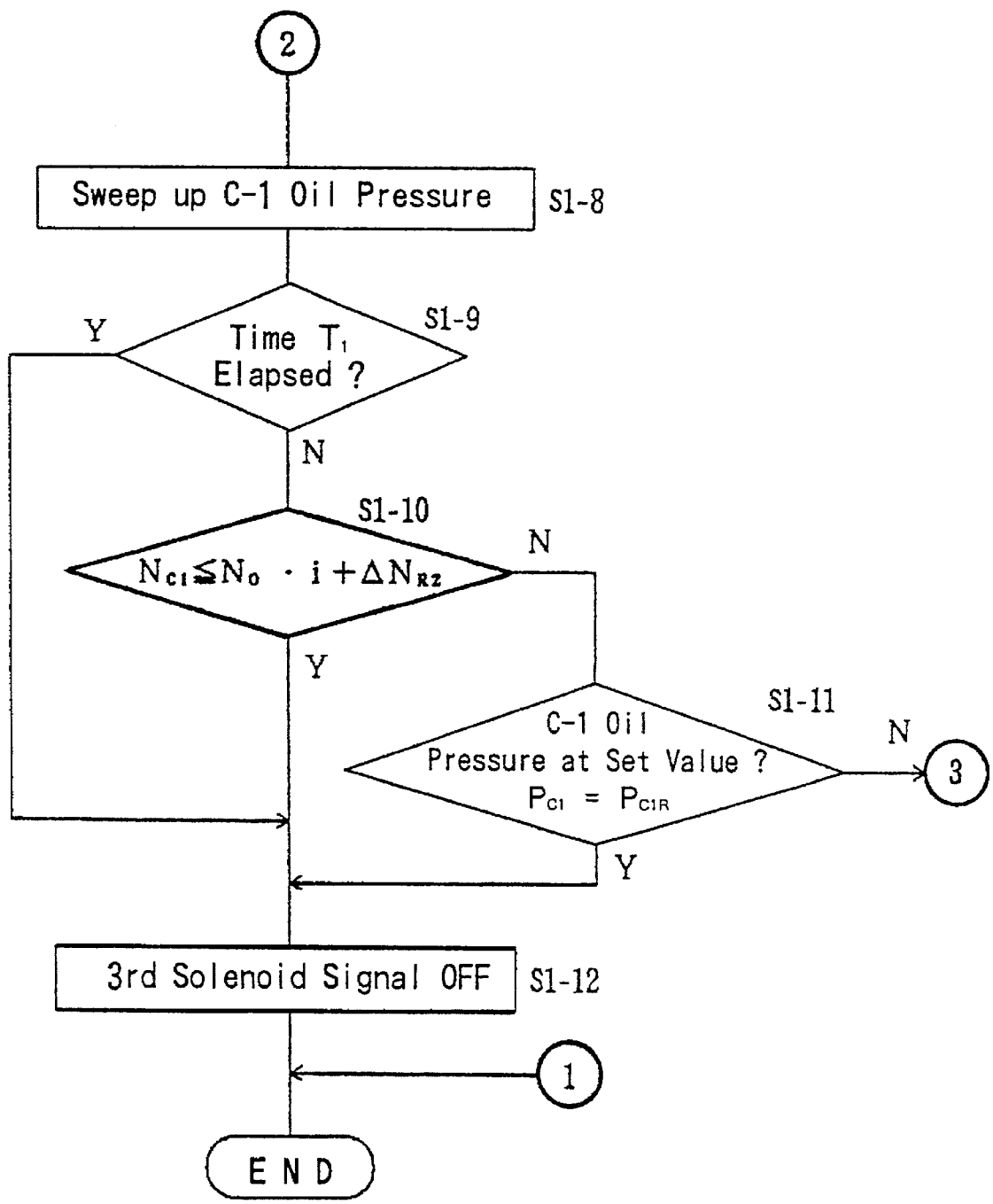
FIG. 8 is a continuation of the flow chart of FIG. 7.

As shown in FIGS. 7 and 8, the N-D change control subroutine of Step S1 of FIG. 6 includes:

Step S1-1: The range changing operation detection means (not shown) decides, on the basis of the signal from the neutral start switch 45 (FIG. 2), whether or not the N-D change has been commanded by a starting operation by the driver. Simultaneously with this, the timing operation by the guard timer is started. The N-D change control subroutine advances to Step S1-2, if the N-D change has been commanded, but is ended if NOT.

Step S1-2: The clutch input side R.P.M. $N_{C1}$ at the N-D change time is detected and set as a value $N_{(1)}$.

Step S1-3: The third solenoid signal $S_3$ for opening/closing the third solenoid valve S3 is turned ON. The third solenoid signal $S_3$ is output as the change signal from the automatic transmission control system 41.

Figure 9:
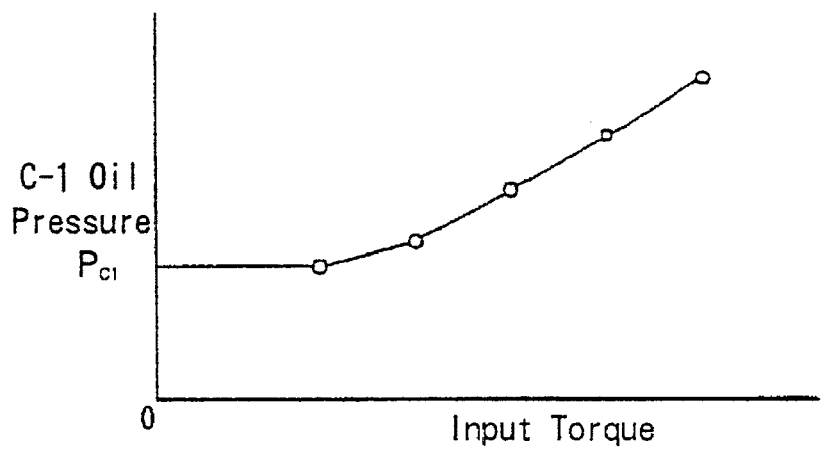
FIG. 9 is a graph of the relationship between input torque and C-1 oil pressure in an embodiment of the present invention.
Figure 10:
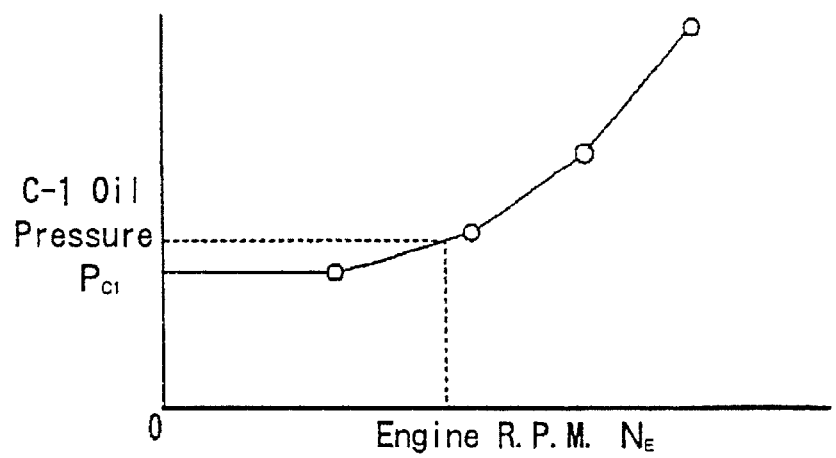
FIG. 10 is a graph of the relationship between engine R.P.M. and C-1 oil pressure in an embodiment of the present invention.
Figure 11:
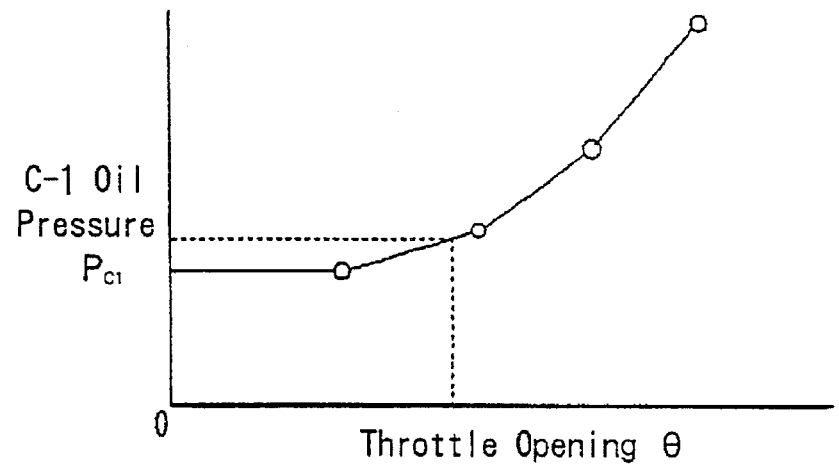
FIG. 11 is a graph of the relationship between throttle opening and C-1 oil pressure in an embodiment of the present invention.

Step S1-4: The C-1 oil pressure $P_{C1}$, in accordance with the input torque, is determined with reference to the map of FIG. 9. On the other hand, the oil pressure $P_{C1}$ is output with idling ON by reference to the map of FIG. 10 and with idling OFF by reference to the map of FIG. 11.

Step S1-5: A first fail check is executed. If the hydraulic control unit 40 (FIG. 1) has its C-1 control valve 67 (FIG. 5) stuck for some reason, there may occur a failure wherein the C-1 oil pressure $P_{C1}$ is not generated by the C-1 control valve 67. In this case, the third solenoid signal $S_3$ is turned OFF to switch the neutral relay valve 64 and thereby interrupt the N-D change control, and the 4th speed shift output is generated for a shift to a higher gear stage so that the D-range pressure is fed to the hydraulic servo C-1 to apply the first clutch C1.

Step S1-5: The clutch input side R.P.M. $N_{C1}$ at that time is detected, and it is decided whether or not the difference $(N_{(1)}-N_{C1})$ between the clutch input side R.P.M. $N_{C1}$ and the value $N_{(1)}$ exceeds a set value $\Delta N_{R1}$. The subroutine advances to Step S1-8, if the value $(N_{(1)}-N_{C1})$ is over the set value $\Delta N_{R1}$, but to Step S1-7 if the value $(N_{(1)}-N_{C1})$ is below the set value $\Delta N_{R1}$.

Step S1-7: It is decided whether or not the throttle opening $\theta$ is over a set value $\theta_R$. The subroutine advances to Step S1-8, if the throttle opening $\theta$ is over the set value $\theta_R$, but returns to Step S1-4 if the throttle opening $\theta$ is below the set value $\theta_R$.

The set value $\Delta N_{R1}$ is set to the value at which the first clutch C1 starts its application (or engagement) after the piston of the hydraulic servo C-1 has reached the end of its stroke and the set value $\theta_R$ is set to a value which indicates that the driver intends to start.

Thus, in the state where the first clutch C1 has not yet started to engage, the subroutine advances to Step S1-7 when the accelerator pedal (not shown) is depressed to increase the throttle opening $\theta$.

Step S1-8: The C-1 oil pressure $P_{C1}$ is swept up. In this case, the C-1 oil pressure $P_{C1}$ is boosted by changing the control signal oil pressure coming from the linear solenoid valve 66 (FIG. 4). After this, the C-1 oil pressure $P_{C1}$ is boosted by set pressure increments $\Delta P$ at every short time period $\Delta t$, to continue the engagement of the first clutch C1.

Step S1-9: It is decided whether or not a time period $T_1$ measured by the guard timer has elapsed. The subroutine advances to Step S1-12, if the time period $T_1$ has elapsed, but to Step S1-10 if NOT.

Step S1-10: It is decided on the basis of the output R.P.M. $N_0$ of the speed change unit 16 whether or not the engagement of the first clutch C1 has been completed. In this case, if the speed change unit 16 has a gear ratio i, it is estimated that the R.P.M. of the output side of the first clutch C1 is $N_0 \bullet i$. Hence, it is decided whether or not the clutch input side R.P.M. $N_{C1}$ is below the sum of the output side R.P.M. $N_0 \bullet i$ and a set value $\Delta N_{R2}$, as follows:

$$N_{C1} \leq N_0 \bullet i + \Delta N_{R2}$$

In short, the completion of the application of C-1 is decided if the inequality holds. The subroutine advances to Step S112, if the engagement of the first clutch C1 is complete, but to S1-11 if NOT.

Step S1-11: It is decided whether or not the C-1 oil pressure $P_{C1}$ has reached a set value $P_{C1R}$. The subroutine advances to Step S1-12, if the C-1 oil pressure $P_{C1}$ has reached the set value $P_{C1R}$, but returns to Step S1-5, if NOT.

Step S1-12: The third solenoid signal $S_3$ is turned OFF.

Thus, in the case of the N-D change, the third solenoid signal $S_3$ for opening/closing the third solenoid valve S3 is turned ON to feed the hydraulic servo C-1 with the C-1 oil pressure $P_{C1}$ corresponding to the input torque. Then, the engagement of the first clutch C1 is started. Moreover, as the clutch input side R.P.M. $N_{C1}$ becomes smaller, the driver depresses the accelerator pedal (not shown) to enlarge the throttle opening $\theta$. Then, the C-1 oil pressure $P_{C1}$ is gradually boosted.

When the engagement of the first clutch C1 is complete, the third solenoid signal $S_3$ is turned OFF to start the vehicle.

When the change to the D-range is thus detected, the neutral relay valve 64 and the C-1 control valve 67 are controlled by the pressure boosting means 117 (FIG. 1) so that the input clutch is brought into a predetermined state of engagement.

Figure 12:
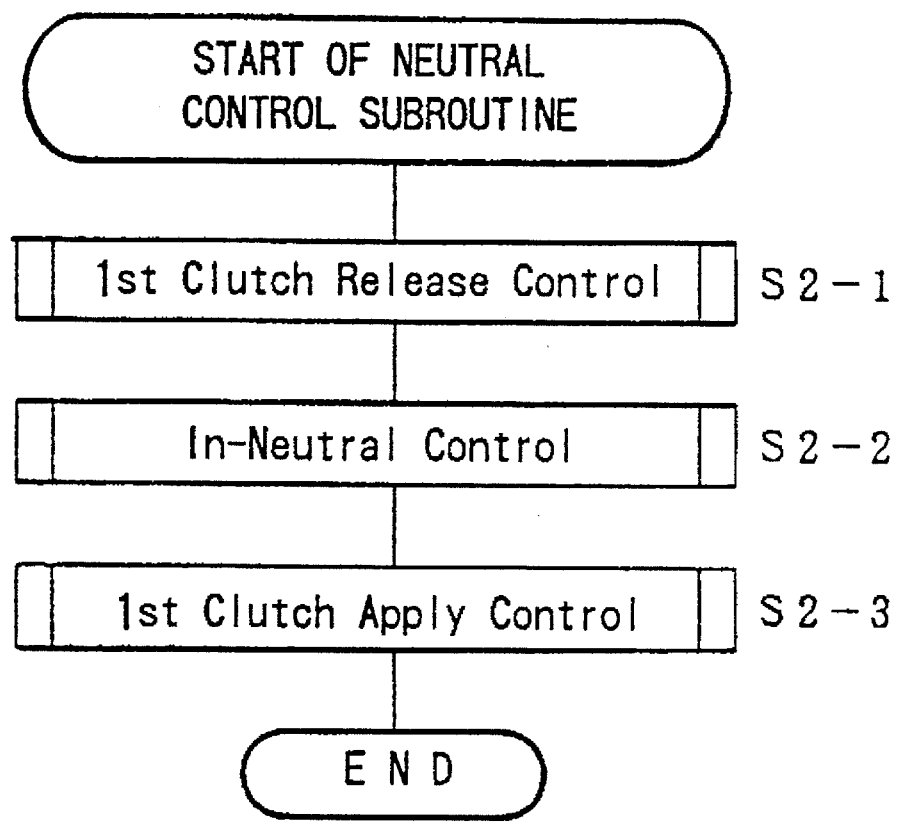
FIG. 12 is a flow chart of the neutral control subroutine shown as step S-2 in FIG. 6.

The neutral control subroutine of Step S2 of FIG. 6 is shown in FIG. 12 and includes:

Step S2-1: The first clutch release control is executed. In this case, the vehicle speed zero is estimated, and the 2nd speed shift output is generated at a set timing to start the engagements of the second brake B2 (FIG. 2) and the third brake B3 to effect hill-hold control wherein the C-1 oil pressure $P_{C1}$ is swept down at a set timing.

For these operations, the engine R.P.M. $N_E$ corresponding to the input torque is determined, and the C-1 oil pressure $P_{C1}$ corresponding to the engine R.P.M. $N_E$ is output and is then gradually reduced.

Incidentally, the input torque can be detected not only from the engine R.P.M. $N_E$ but also indirectly from the engine air intake, the fuel injection rate and so on. Moreover, the input torque of the speed change unit 16 can also be directly detected by the torque sensor (not shown) attached to the output shaft 14 of the torque converter 12.

Step S2-2: The in-neutral control is executed to establish the neutral control state. In this case, the stabilization of the engine R.P.M. $N_E$ and of the clutch input side $N_{C1}$ is awaited. The C-1 oil pressure $P_{C1}$ is boosted or reduced by set pressure increments on the basis of the engine R.P.M. $N_E$ and clutch input side R.P.M. $N_{C1}$, once stabilized.

Step S2-3: The starting operation detection means 111 (FIG. 1) executes the first clutch apply control. In this case, the C-1 oil pressure $P_{C1}$ is boosted by the set values which are set on the basis of the throttle opening $\theta$, the engine R.P.M. $N_E$ and so on, to end the stroke of the piston of the hydraulic servo C-1 (FIG. 5). After the end of the piston stroke of the hydraulic servo C-1, the C-1 oil pressure $P_{C1}$ is boosted by the set pressure increments to prevent application shock.

Figure 13:
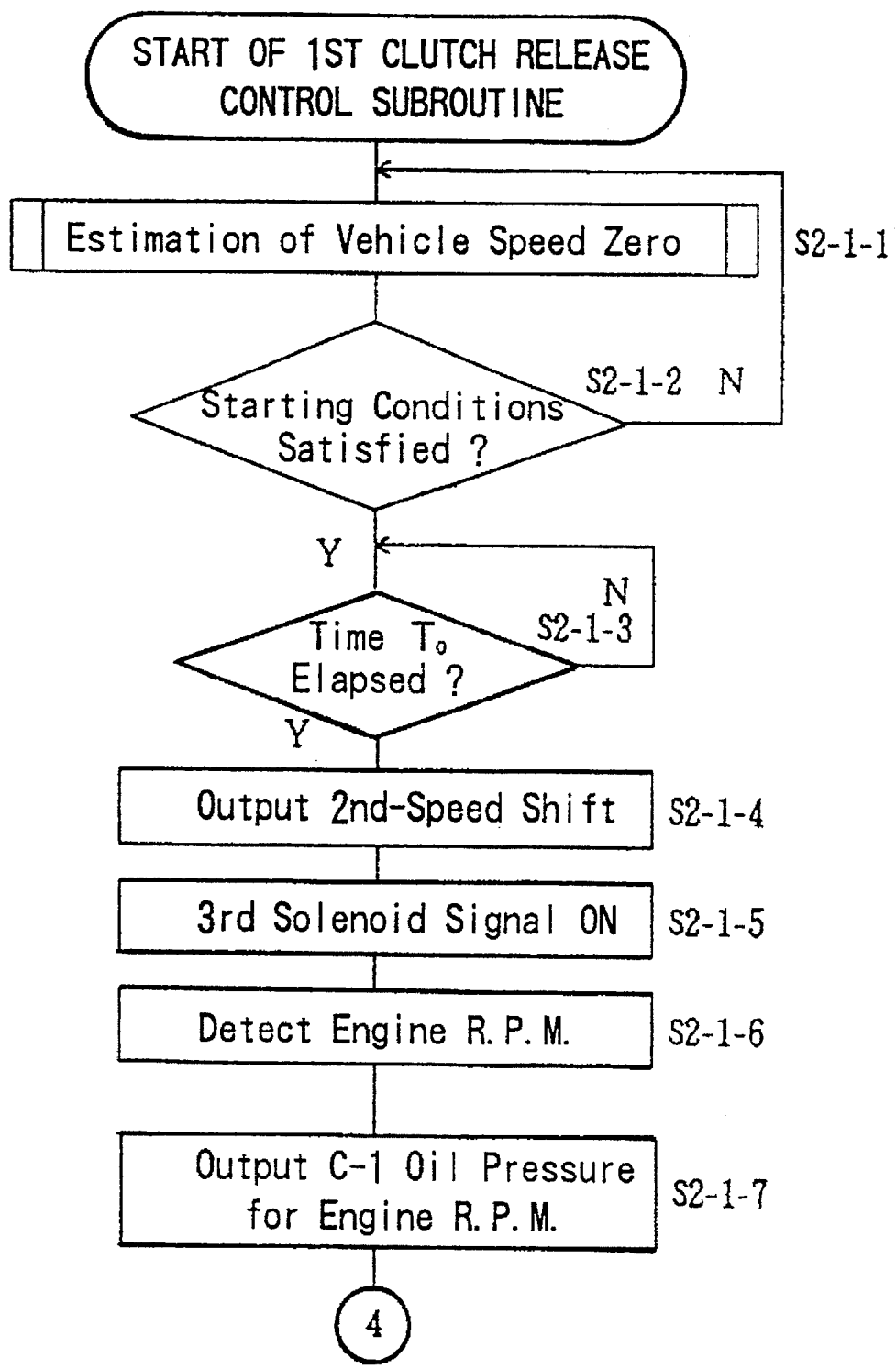
FIG. 13 is a flow chart of a first clutch release control subroutine.
Figure 14:
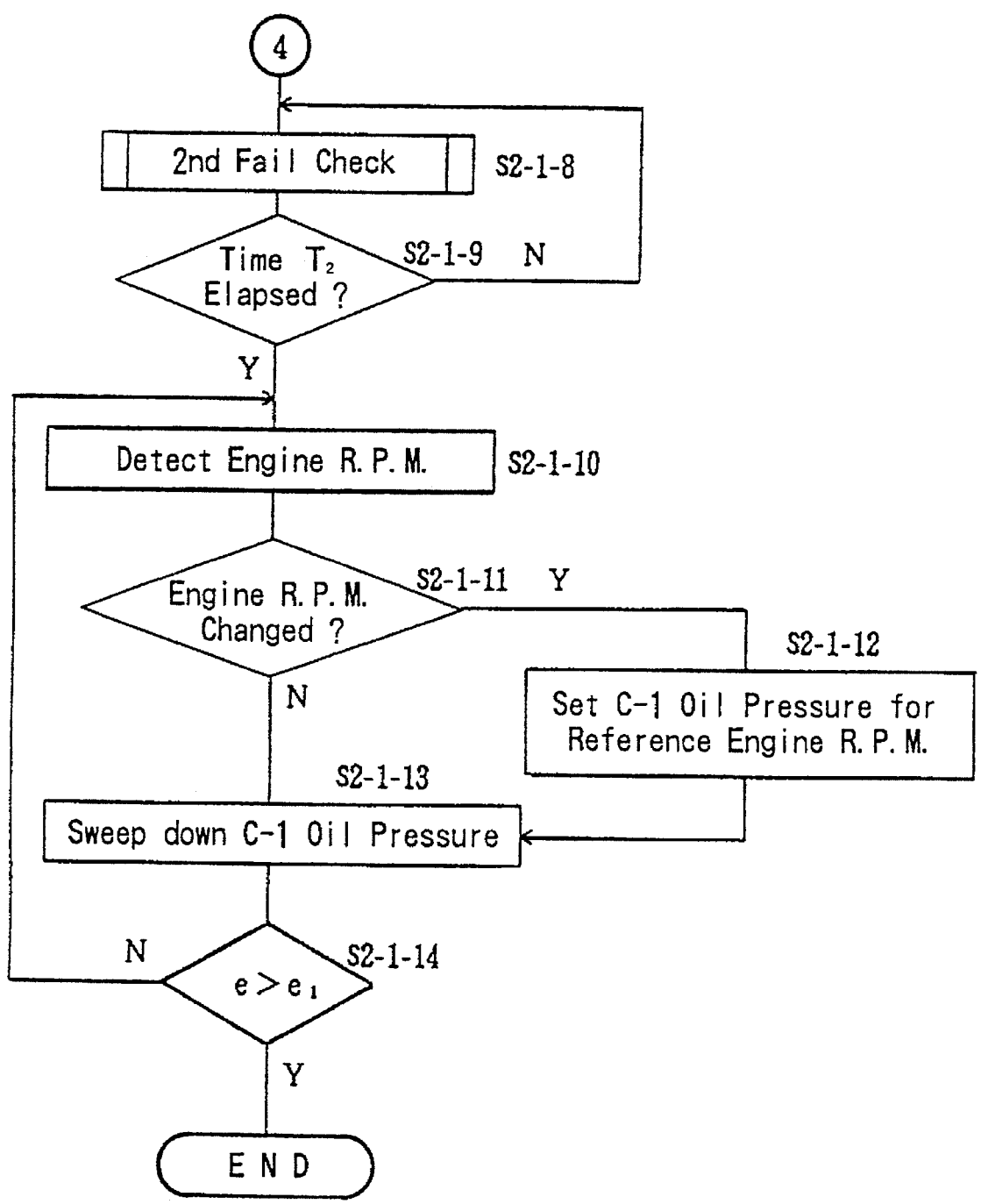
FIG. 14 is a continuation of the flow chart of FIG. 13.

The subroutine for the first clutch release control of the Step S2-1 in FIG. 12 is shown in FIGS. 13 and 14 and includes:

Step S2-1-1: The stop state detection means 110 (FIG. 1) executes the vehicle speed zero estimation on the basis of the clutch input side R.P.M. $N_{C1}$.

Step S2-1-2: The stop state detection means waits until the neutral control starting conditions are satisfied. Simultaneously with this, the timing operation of the first timer (not shown) is started.

In this case, satisfaction of the starting conditions is decided if all the following conditions are met: the clutch input side R.P.M. $N_{C1}$ is substantially 0; the accelerator pedal is released so that the throttle opening $\theta$ is below a predetermined value; the oil temperature detected by the oil temperature sensor 46 (FIG. 2) is over a predetermined value; and the brake pedal is depressed to turn ON the brake switch 48. Incidentally, whether or not the clutch input side R.P.M. N is substantially 0 is decided depending upon whether or not a limit for the R.P.M. sensor 47 is detected. In the present embodiment, this limit is an actual vehicle speed of 2 km/h.

Step S2-1-3: The stop state detection means awaits lapse of the time period $T_0$ measured by the first timer, and the subroutine advances to Step S2-1-4 upon lapse of the time period $T_0$. Here, this time period $T_0$ is calculated by the vehicle speed zero estimation, and it is estimated that the vehicle speed is 0 when the time period $T_0$ has elapsed.

Step S2-1-4: The shift output generating means 115 (FIG. 1) outputs the 2nd speed shift output for starting the hill-hold control to turn ON the first solenoid signal $S_1$ for opening/closing the first solenoid valve S1 (FIG. 4) so that the oil pressure is fed to apply the hydraulic servo B-2. In accordance with the rise of the oil pressure in the hydraulic servo B-2, moreover, the sequence pressure in the hydraulic servo B-2 is fed to the B-1 sequence valve 56 (FIG. 5) so that the oil pressure is fed to apply the hydraulic servo B-1.

Thus, the hill hold control is executed to establish the 2nd speed gear stage in the speed change unit 16 so that the first clutch C1, the first brake B1, the second brake B2 and the fourth brake B4 are applied to lock the one-way clutches F1 and F3. In this state, for the vehicle to roll backward on an upgrade, backward rotation would be transmitted to the output shaft 23 of the auxiliary transmission 19 to rotate the ring gear $R_1$ forward. However, this rotation is blocked by the one-way clutch F2 so that the vehicle will not roll backward.

Step S2-1-5: The third solenoid signal $S_3$ is turned ON to switch the neutral relay valve 64 to the upper half position to thereby bring the C-1 oil pressure $P_{C1}$ into a controllable state.

Figure 15:
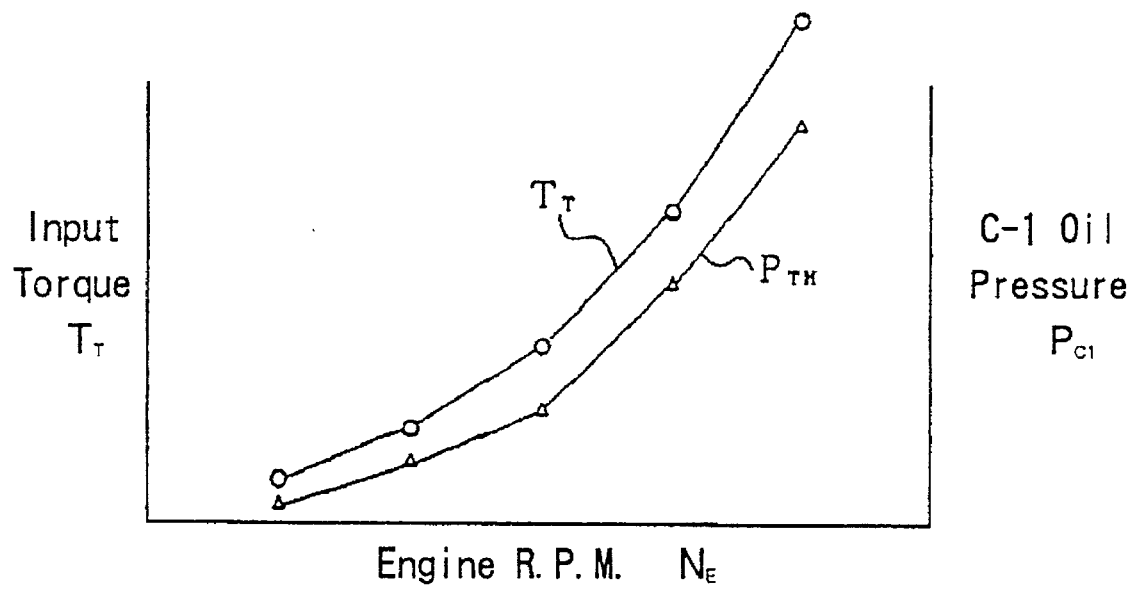
FIG. 15 Is a graph of the relationship between engine R.P.M., and input torque ($T_T = t \bullet C \bullet N_E^2$) [Kg$\bullet$m], and C-1 oil pressure $P_{C1O}$ and throttle pressure.

Step S2-1-6: The engine R.P.M. $N_E$ corresponding to the input torque $T_T$ is detected, as shown in FIG. 15, to set a reference engine R.P.M. $N_{Em}$ with the engine R.P.M. $N_E$.

Step S2-1-7: In accordance with the engine R.P.M. $N_E$, the C-1 oil pressure $P_{C1}$ is generated just before the first clutch C1 is released.

Step S2-1-8: When the second fail check determines a failure, the neutral control is interrupted, and the 1st speed shift output is generated to feed the D-range pressure to the hydraulic servo C1 to thereby apply the first clutch C1. Simultaneously with this, the timing operation of the timer is started.

Step S2-1-9: It is decided whether or not the time period $T_2$, as determined by the timing operation of the timer, has elapsed. The subroutine advances to Step S2-1-10, if the time period $T_2$ has elapsed, but returns to Step S2-1-8 if NOT.

Step S2-1-10: The engine R.P.M. $N_E$ corresponding to the input torque TT is again detected.

Step S2-1-11: It is decided whether or not the engine R.P.M. $N_E$ has changed, as compared with the reference engine R.P.M. $M_{Em}$. The subroutine advances to Step S2-1-12, if the answer is YES, but to Step S2-1-13 if NO.

Step S2-1-12: The reference engine R.P.M. $N_{Em}$ is set to the value of the engine R.P.M. $N_E$ at the instant when it is decided in Step S2-1-11 that the engine R.P.M. $N_E$ has changed with respect to the reference engine R.P.M. $N_{Em}$ and the C-1 oil pressure $P_{C1}$ is changed to the C-1 oil pressure $P_{C1}$ corresponding to the new reference engine R.P.M. $N_{Em}$.

Step S2-1-13: The pressure reducing means 116 (FIG. 1) reduces (or sweeps down) the C-1 oil pressure $P_{C1}$, by set pressure increments $P_{THDOWN}$ upon each lapse of a set time period $T_{DOWN}$, as expressed by the following equation:

$$P_{TH} = P_{TH} - P_{THDOWN}.$$

Step S2-1-14: After the release state of the first clutch C1 has been established, the pressure reduction of Step S2-1-13 is continued until the speed ratio e ($=N_{C1}/N_E$) exceeds a constant $e_1$. This pressure reduction of Step S2-1-13 is interrupted when the gear ratio e exceeds the constant $e_1$. The constant $e_1$ is set to 0.75, for example, in consideration of the delay of the change of the clutch input side R.P.M. $N_{C1}$ due to manipulation of the oil pressure when the first clutch C1 is released. Incidentally, the speed ratio e may be replaced by the clutch input side R.P.M. $N_{C1}$.

The differential rotation $\Delta N$ will not change regardless of whether the first clutch C1 might be completely applied or released. Therefore, it is difficult to differentiate the state in which the first clutch C1 is completely applied, and the state in which the first clutch C1 is released on the basis of a change in differential rotation $\Delta N$. Therefore, the state just before the application of the first clutch C1 is started can be restored without fail by waiting until the speed ratio e exceeds the constant $e_1$.

Figure 16:
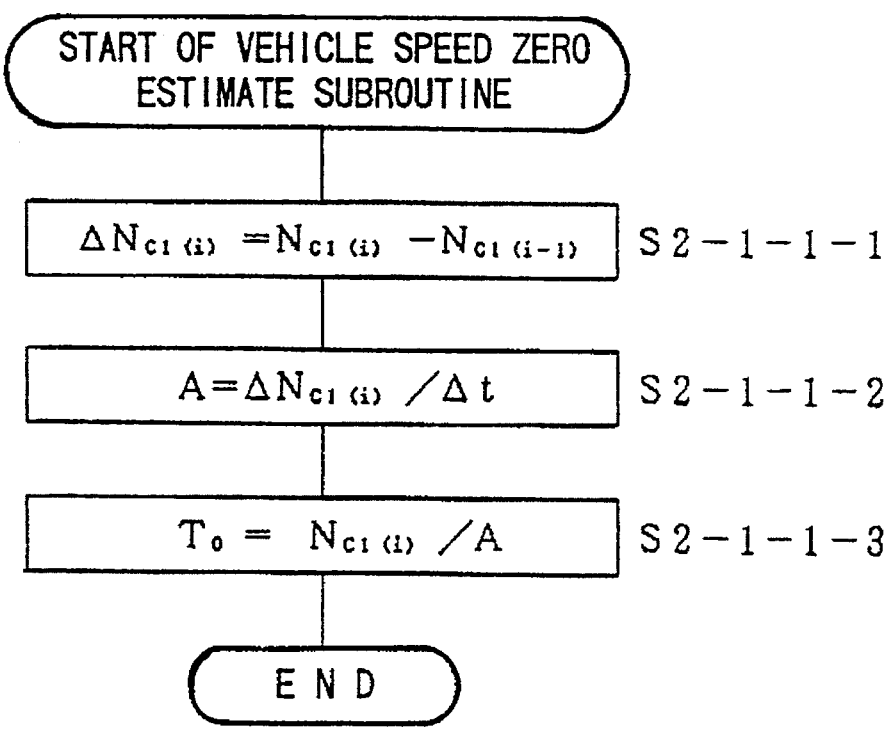
FIG. 16 is a flow chart of a vehicle speed zero estimate subroutine.

The subroutine for the vehicle speed zero estimation of Step S2-1-1 of FIG. 13 is shown in FIG. 16 and includes:

Step S2-1-1-1: The R.P.M. difference $\Delta N_{C1(1)}$, is calculated by subtracting clutch input side R.P.M. $N_{C1(1-1)}$, of a time period prior from the clutch input side R.P.M. $N_{C1(1)}$, of the present time. The time period $\Delta t$ is set by the clock in the automatic transmission control unit 41 (FIG. 2) so that the clutch input side R.P.M. $N_{C1}$ is detected every time period $\Delta t$.

Step S2-1-1-2: A deceleration A of the vehicle is calculated by dividing the R.P.M. difference $\Delta N_{C1(1)}$ by the time period Step S2-1-1-3: The time period $T_0$ until the stop of the vehicle is calculated by dividing the present clutch input side R.P.M. $N_{C1(1)}$ by the deceleration A.

Figure 17:
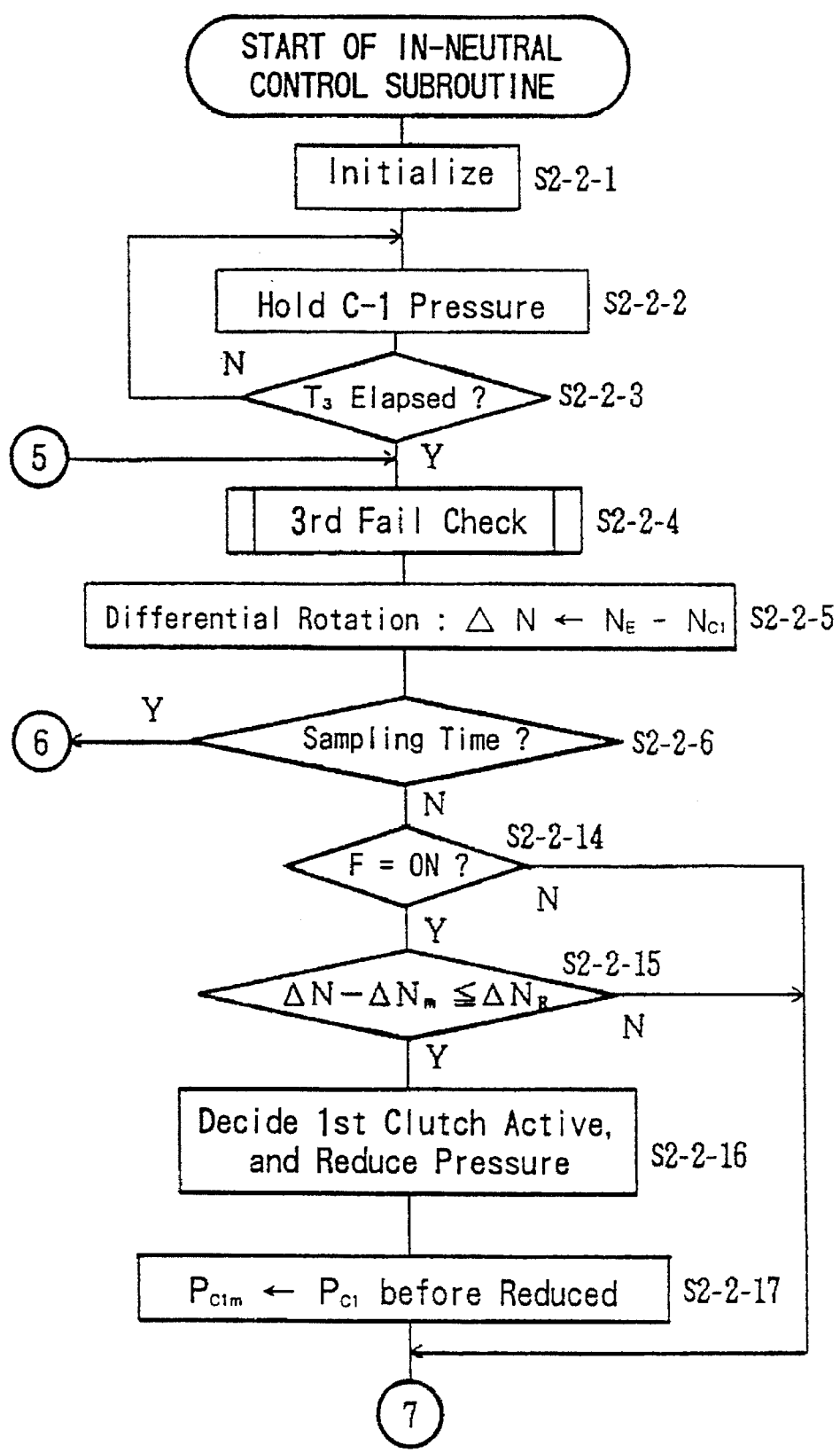
FIG. 17 is a flow chart of an in-neutral control subroutine.
Figure 18:
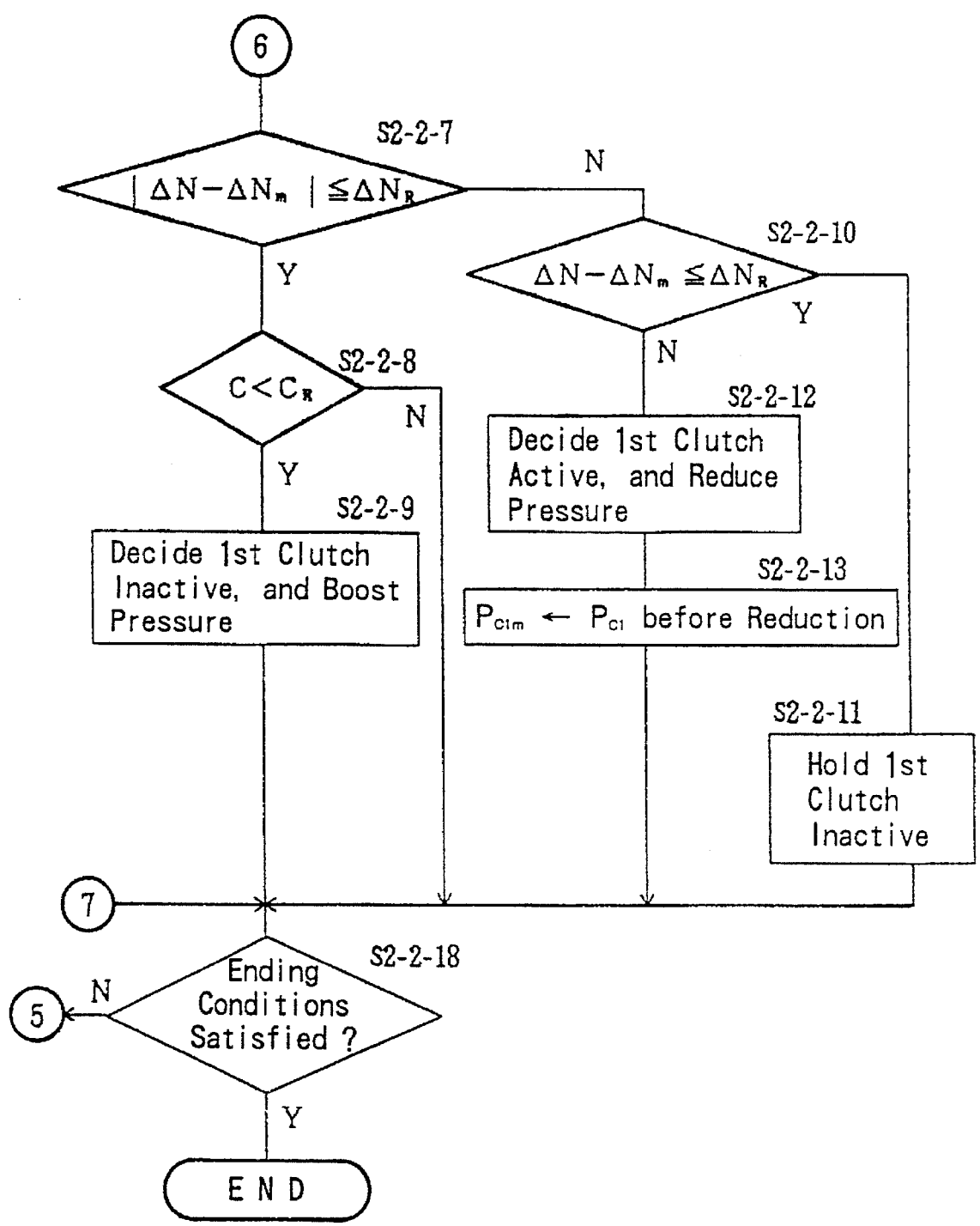
FIG. 18 is a continuation of the flow chart of FIG. 17.

The subroutine of the in neutral control of Step S2-2 of FIG. 12 will now be described with reference to FIGS. 17 and 18. This neutral control includes:

Step S2-2-1: An oil pressure control flag F, the count value C of the counter (not shown), and the reference R.P.M. difference $\Delta N_m$ are set to the following initial values:

F←Off;

C←0;

and $\Delta N_m$←the value $(N_E - N_{C1})$ at that time.

Steps S2-2-2 and S2-2-3: The C-1 oil pressure $P_{C1}$ is held at the final value of the-first clutch release control. After it has been confirmed that the first clutch C1 has released to a predetermined extent, a decision is promptly made as to whether the differential rotation $\Delta N$ has changed. However, this decision may be erroneous due to the pressure reduction in the first clutch release control and, therefore, the second timer (not shown) is used to continue holding the C-1 oil pressure $P_{C1}$ until the time period $T_2$ has elapsed. As a result, the decision as to whether or not the differential rotation $\Delta N$ has changed is postponed to prevent the C-1 oil pressure $P_{C1}$ from being controlled in the unstable state just after the first clutch C1 has been released. When the time period $T_3$ has elapsed, the subroutine advances to Step S2-2-4.

Step S2-2-4: When the third fail check decides a failure, the neutral control is interrupted and the 4th speed shift output is generated so that the D-range pressure is fed to the hydraulic servo C-1 to apply the first clutch C1.

Step S2-2-5: The differential rotation $\Delta N$ between the engine R.P.M. $N_E$ and the clutch input side R.P.M. $N_{C1}$ is calculated.

Step S2-2-6: It is decided whether or not a preset sampling time has been reached, that is, whether or not a time period of, e.g. 1.0 sec or 0.5 sec, has elapsed. The subroutine advances to Step S2-2-7, if the sampling time has been reached, but to Step S2-2-14 if NOT.

Figure 19:
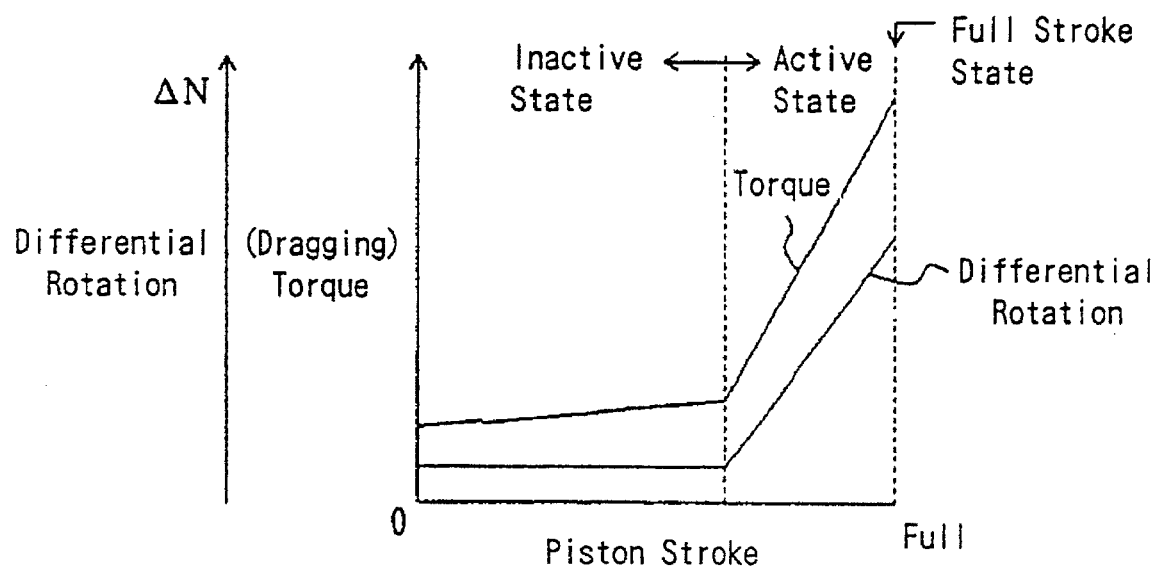
FIG. 19 is a graph illustrating operation of the first clutch in the neutral control state and plots the differential rotation $\Delta N$ and the dragging torque against the piston stroke.

Step S2-2-7: It is decided whether or not the absolute value of the difference between the differential rotation $\Delta N$ and the reference differential rotation $\Delta N_m$ is below a set value $\Delta N_R$, that is, whether or not the change in the differential rotation $\Delta N$ is below the set value $\Delta N_R$. The subroutine advances to Step S2-2-8, if below the set value $\Delta N_R$, but to Step S2-2-10 if over the set value $\Delta N_R$. This set value $\Delta N_R$ is set in advance to discriminate between the active state and the inactive state of the first clutch C1, as shown in FIG. 19.

The differential rotation $\Delta N$ may be erroneously determined to have changed, if the engine R.P.M. $N_E$ or the clutch input side R.P.M. $N_{C1}$ are erroneously detected by the engine R.P.M. sensor 49 (FIG. 2) and the R.P.M. sensor 47, or if there is an error in the calculations. Noting that the differential rotation $\Delta N$ is abruptly changed if the application of the first clutch C1 is started prematurely, therefore, such an error can be prevented by deciding a change of the differential rotation $\Delta N$ only if the change in the differential rotation $\Delta N$ exceeds the set value $\Delta N_R$. Moreover, if this set value $\Delta N_R$ is varied according to the oil temperature, the C-1 oil pressure $P_{C1}$ can be properly controlled for low to high temperatures of the oil.

Step S2-2-8: It is decided whether or not the count value C of the counter is below a set value $C_R$. The subroutine advances to Step S2-2-9, if below the set value $C_R$, but to Step S2-2-18 if over the set value $C_R$.

Figure 20:
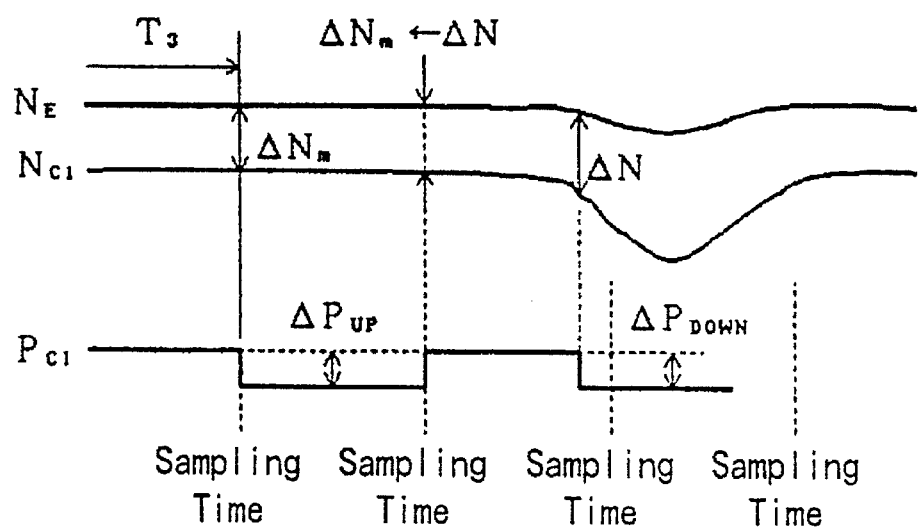
FIG. 20 is a time chart illustrating engine R.P.M., clutch input side R.P.M. and C-1 oil pressure, in neutral control.

Step S2-2-9: The pressure boosting means 117 (FIG. 1) decides that the first clutch C1 is inactive, because of no change in the differential rotation ΔN. In this state, to prevent the piston from returning too far, the C-1 oil pressure $P_{C1}$ is boosted, as shown in FIG. 20, by a set pressure $\Delta P_{UP}$, as follows:

$$P_{C1} \leftarrow P_{C1} + \Delta P_{UP}.$$

Moreover, the reference differential rotation $\Delta N_m$ is set at the differential rotation ΔN, and the oil pressure control flag F is turned ON:

$$\Delta N_m \leftarrow \Delta N;$$

and $$F \leftarrow ON.$$

Step S2-2-10: It is decided whether or not the change in the differential rotation ΔN is tending to decrease, that is, whether or not the difference between the differential rotation ΔN and the reference differential rotation $\Delta N_m$ is below the set value $\Delta N_R$. The subroutine advances to Step S2-2-11, if below the set value $\Delta N_R$, but to Step S2-2-12 if over the set value $\Delta N_R$.

Step S2-2-11: When the first clutch C1 is decided to be in transition from the active state to the inactive state, the C-1 oil pressure $P_{C1}$ is held at the value of that time, and the oil pressure control flag F is turned OFF:

$$F \leftarrow OFF.$$

Thus, even if the differential rotation ΔN is changed, this change is in the direction of a decrease when the first clutch C1 is in transition from the active state to the inactive state. At this time, if the C-1 oil pressure $P_{C1}$ is further reduced, the piston may abruptly move back with an excessive stroke loss. Therefore, the reduction of the C-1 oil pressure $P_{C1}$ is once inhibited and held at the value of that time when the first clutch C1 is in transition from the active to the inactive state.

Step S2-2-12: The pressure reducing means 116 reduces the C-1 oil pressure $P_{C1}$ by a set pressure $\Delta P_{DOWN}$ because the first clutch C1 can be in transition from the inactive to the active state, as follows:

$$P_{C1} \leftarrow PC1 - \Delta P_{DOWN}.$$

Moreover, the reference differential rotation $\Delta N_m$ is set at the differential rotation ΔN, and the oil pressure control flag F is turned OFF whereas the value "1" is subtracted from the count value of the counter:

$$\Delta N_m \leftarrow \Delta N;$$

$$F \leftarrow OFF;$$

and $$C \leftarrow C-1 \text{ (or } C=0 \text{ for } C<0).$$

Step S2-2-13: The C-1 oil pressure $P_{C1}$, before reduction at Step S2-2-11, is set as a reference C-1 oil pressure $P_{C1m}$ and stored in memory:

$$P_{C1m} \leftarrow P_{C1} \text{ before reduced.}$$

Step S2-2-14: It is decided whether or not the oil pressure control flag F is ON, that is, whether or not the C-1 oil pressure $P_{C1}$ has been boosted at a previous sampling. The subroutine advances to Step S2-2-15, if the oil pressure control flag F is ON, but to Step S2-2-18 if OFF.

Step S2-2-15: It is decided whether or not the difference of the differential rotation ΔN from the reference differential rotation $\Delta N_m$ is below the set value $\Delta N_R$ because the C-1 oil pressure $P_{C1}$ has been boosted at the previous sampling. The subroutine advances to Step S2-2-16, if below the set value $\Delta N_R$, but to Step S2-2-18 if over the set value $\Delta N_R$.

Step S2-2-16: The differential rotation ΔN is changed by boosting the C-1 oil pressure $P_{C1}$ of the previous sampling. As a result, it is decided that the first clutch C1 is in the active state, and the C-1 oil pressure $P_{C1}$ is reduced by the set pressure $P_{DOWN}$:

$$P_{C1} \leftarrow P_{C1} - \Delta P_{DOWN}.$$

Moreover, the reference differential rotation $\Delta N_m$ is set at the differential rotation ΔN, and the oil pressure control flag F is turned OFF whereas the value "1" is added to the count value of the counter, as follows:

$$\Delta N_m \leftarrow \Delta N;$$

$$F \leftarrow OFF;$$

and $$C \leftarrow C+1.$$

As described before, it is decided whether or not the differential rotation ΔN has been changed at each sampling. If the C-1 oil pressure $P_{C1}$ is boosted according to the decision, the application of the first clutch C1 may be instantly started, but if the first clutch C1 is released idle vibration may be generated if the torque transmission has started. Therefore, in case the differential rotation ΔN is increased while the application of the first clutch C1 is being started, the C-1 oil pressure $P_{C1}$ is reduced without awaiting the subsequent sampling. Thus, the first clutch C1 is prevented from releasing to prevent idle vibration.

As noted above, the C-1 oil pressure $P_{C1}$ is changed at each sampling when the differential rotation ΔN is higher than the set value $\Delta N_R$. When the differential rotation changes only very gradually, i.e. little by little, the C-1 oil pressure $P_{C1}$ may not be changed despite the first clutch C1 having transferred to the applied state. Therefore, the reference differential rotation $\Delta N_m$ is updated only when the C-1 oil pressure $P_{C1}$ has changed. As a result, change of the C-1 oil pressure $P_{C1}$ is assured, even if the differential rotation ΔN changes only gradually so that the first clutch C1 is transferred to the applied state.

Step S2-2-17: The C-1 oil pressure $P_{C1}$ before reduction at Step S2-2-16 is set as a reference C-1 oil pressure $P_{C1m}$ and stored in memory, as follows:

$P_{C1m} \leftarrow P_{C1}$ before reduction.

Step S2-2-18: It is decided whether or not the conditions for ending the in-neutral control of the first clutch C1 are satisfied. If the ending conditions are satisfied, the in-neutral control is ended. Otherwise, the subroutine returns to Step S2-2-4, and the foregoing steps are repeated.

The subroutine for the first clutch apply control at Step S2-3 of FIG. 12 will now be described with reference to FIGS. 21 and 22 wherein:

Step S2-3-1: The clutch input side R.P.M. $N_{C1(1)}$, at the instant when the in-neutral control ending conditions are satisfied, is stored as a value $N_{(1)}$, in memory in the automatic transmission control unit 41 (FIG. 2). Simultaneously with this, the timing operation of the guard timer is started.

Step S2-3-2: A constant $P_{C1S}$ as a shelf pressure is added to the reference C-1 oil pressure $P_{C1m}$ as the base pressure set at Steps S2-2-13 and S2-2-18, and the sum is set as the C-1 oil pressure $P_{C1}$. Incidentally, the constant $P_{C1S}$ is set to such a value as to move the piston (not shown) of the hydraulic servo C-1 (FIG. 5) without fail and to reduce the engaging shock generated by the application.

As a result, when the driver starts the vehicle so that a change from the stop to the start states of the vehicle is detected, the constant $P_{C1S}$ is added to the reference C-1 oil pressure $P_{C1}$m so that the oil pressure fed to the hydraulic servo C-1 is boosted to bring the first clutch C1 into a partially applied state. Subsequently, the oil pressure fed to the hydraulic servo C-1 is further boosted to bring the first clutch C1 into the completely applied state.

Step S2-3-3: When the first fail check decides a failure, the neutral control is interrupted, and the 4th speed shift output is generated to feed the D-range pressure to the hydraulic servo C1 to thereby apply the first clutch C1.

Step S2-3-4: The subroutine waits until the clutch input side R.P.M. $N_{C1}$ becomes smaller than the difference obtained by subtracting the value $N_{(1)}$ from a constant DSN. If the clutch input side R.P.M. $N_{C1}$ is smaller than the difference between the value $N_{(1)}$ and the constant DSN, the start of engagement of the first clutch C1 is decided so that the subroutine advances to Step S2-3-5. On the other hand, if the clutch input side R.P.M. $N_{C1}$ is larger than the difference between the value $N_{(1)}$ and the constant DSN, the subroutine returns to Step S2-3-3.

Step S2-3-5: It is decided whether or not the gear stage is at the 1st speed. Then, the subroutine advances to Step S2-3-7, if at the 1st speed, but to Step S2-3-6 if NOT.

Step S2-3-6: The shift output generating means 115 (FIG. 1) generates the 1st speed shift output.

Step S2-3-7: The pressure boosting means 117 changes the throttle pressure $P_{TH}$ coming from the linear solenoid valve 66 (FIG. 4) and sweeps up the C-1 oil pressure $P_{C1}$. After this, this C-1 oil pressure $P_{C1}$ is boosted by a set pressure increment $\Delta P_B$ upon each lapse of a time period $\Delta t_B$ to continue the engagement of the first clutch C1.

Step S2-3-8: It is decided whether or not a time period measured by the guard timer has elapsed. The subroutine advances to Step S2-3-11, if the time period $T_4$ has elapsed, but to Step S2-3-9 if NOT.

Step S2-3-9: It is decided whether or not the clutch input R.P.M. $N_{C1}$ is smaller than a constant DEN. The subroutine advances to Step S2-3-10, if the clutch input R.P.M. $N_{C1}$ is below the constant DEN, but returns to Step S2-3-3 if over the constant DEN. Incidentally, the third timer starts its timing operation if it is decided that the clutch input R.P.M. $N_{C1}$ is below the constant DEN.

Step S2-3-10: It is decided whether or not a time period $T_5$ measured by the third timer has elapsed. The subroutine advances to Step S2-3-11, if the time period $T_5$ has elapsed, but returns to Step S2-3-3 if NOT.

In this case, the set values of the constant $P_{C1S}$, the pressure $P_B$, the set pressure $\Delta P_B$ and so on are determined on the basis of a variable corresponding to the input torque $T_T$ such as the throttle opening $\theta$.

Step S2-3-11: The third solenoid signal $S_3$ is turned OFF.

Figure 24:
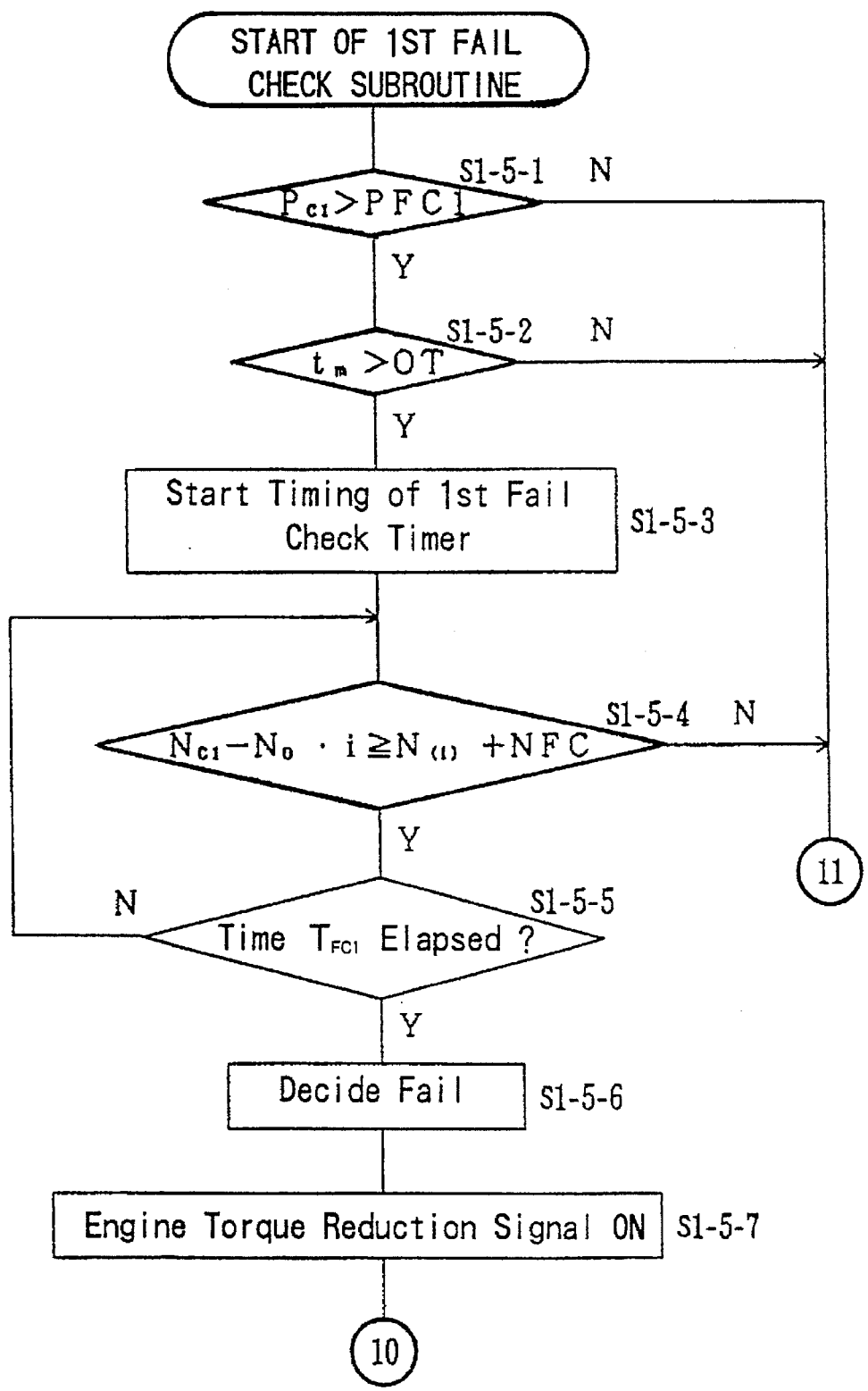
FIG. 24 is a flow chart of a first fail check subroutine.
Figure 25:
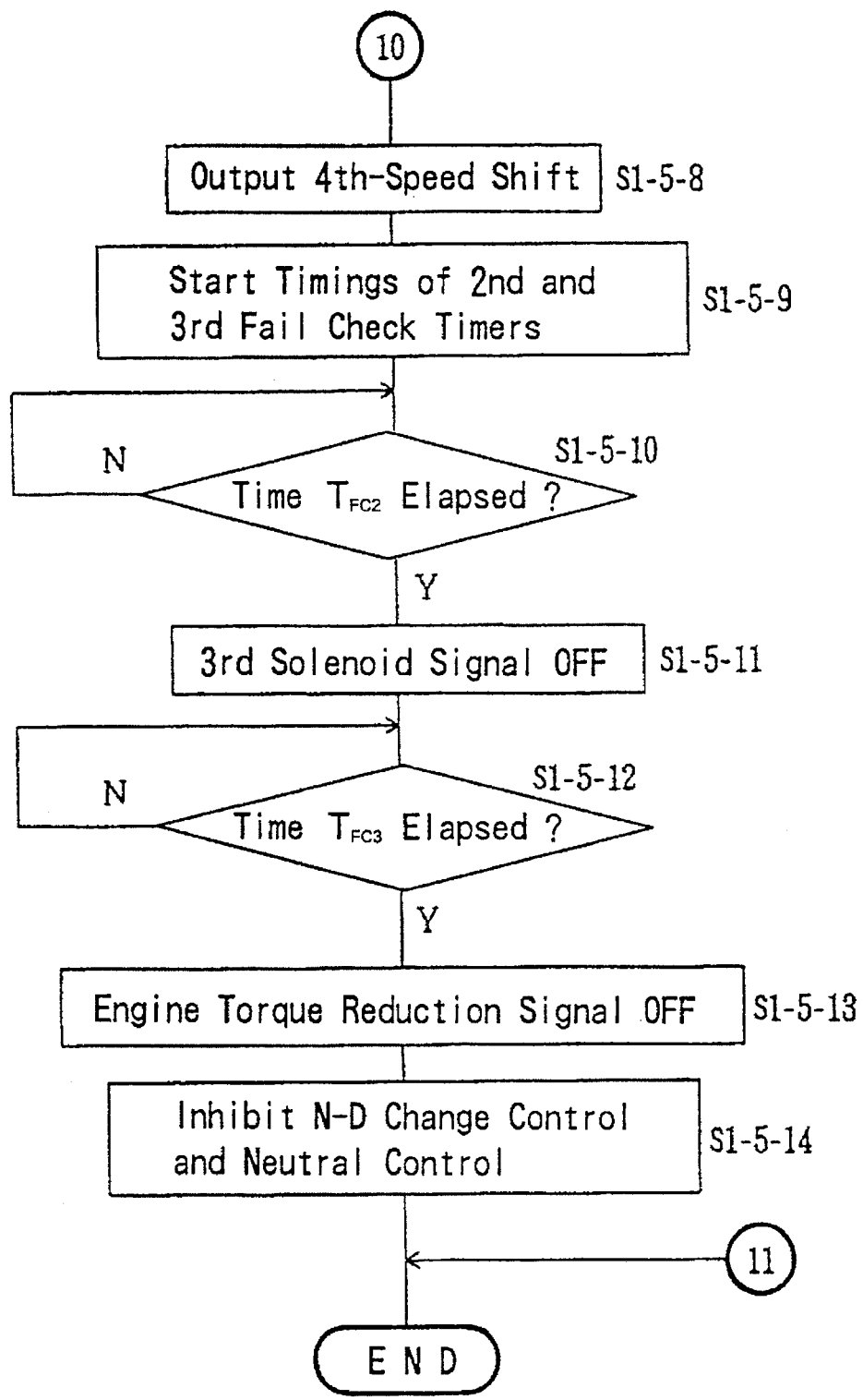
FIG. 25 is a continuation of the flow chart for the first fail check subroutine of FIG. 24.

The first fail check subroutine of Step S1-5 of (FIG. 7) and Step S2-3-3 of FIG. 21 will now be described with reference to FIGS. 24 and 25.

Figure 21:
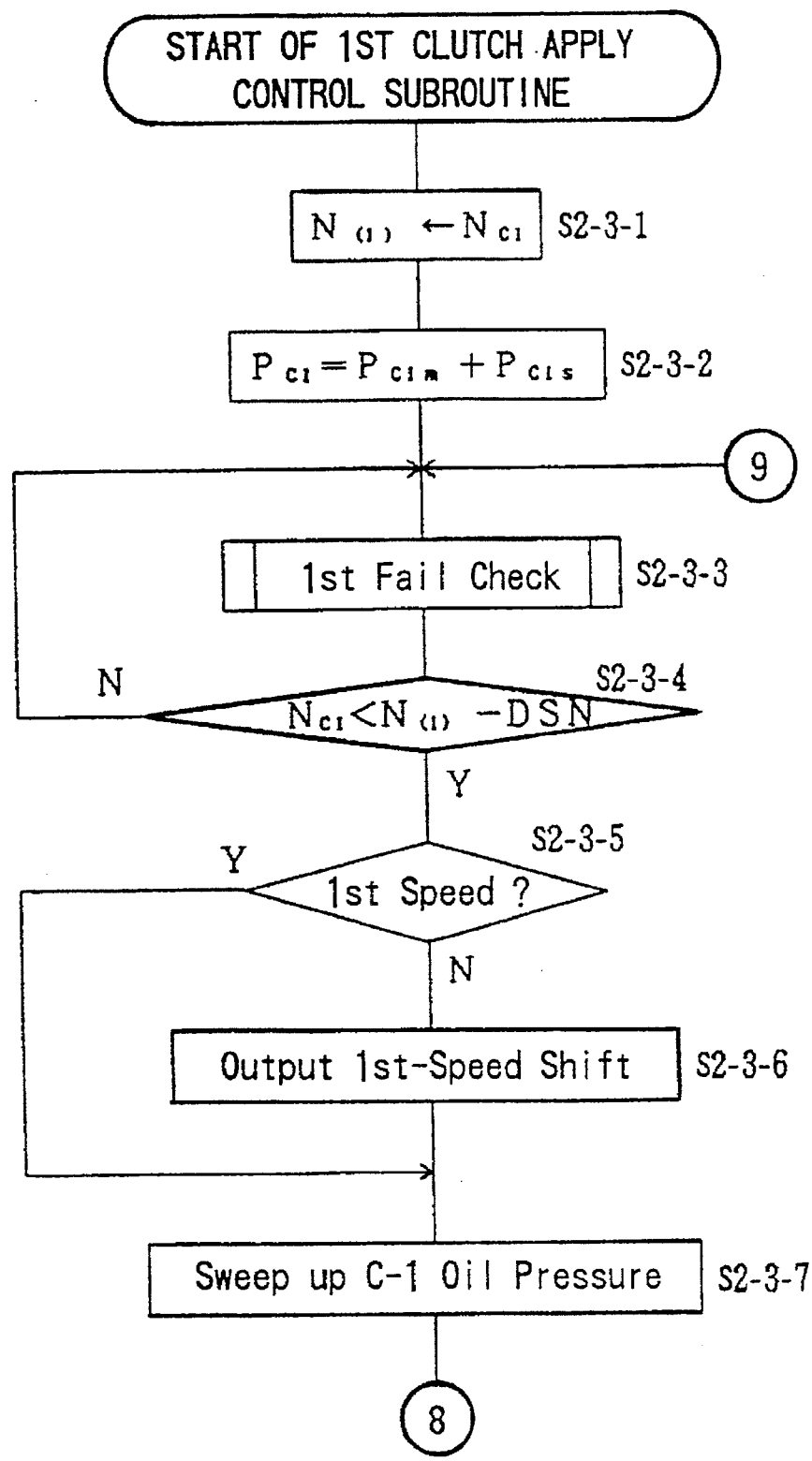
FIG. 21 is a flow chart of a first clutch apply control subroutine.
Figure 22:
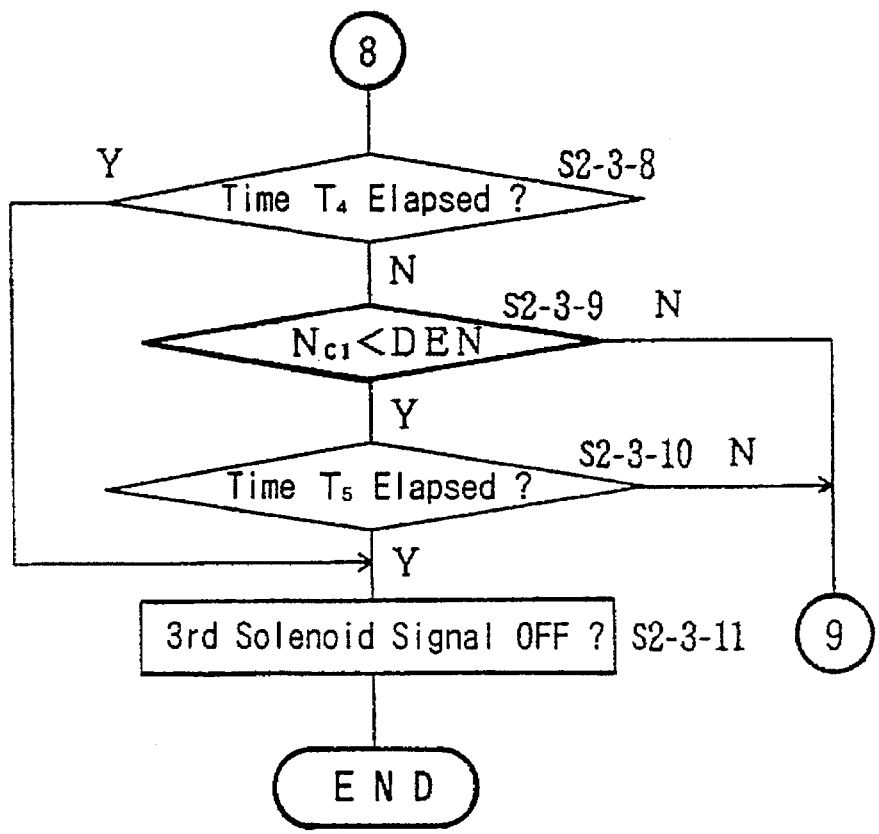
FIG. 22 is a continuation of the flow chart of the first clutch apply, control subroutine of FIG. 21.
Figure 23:
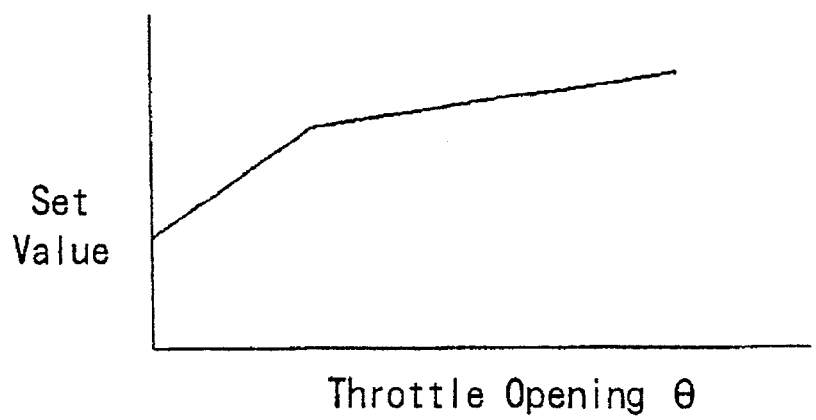
FIG. 23 is a diagram illustrating the relationship between a throttle opening and a set value.

Only the subroutine of the first fail check of Step S1-5 of FIG. 7 will be described for convenience; however, the subroutine of the first fail check of Step S2-3-3 of FIG. 21 is composed of the same steps. In FIGS. 24 and 25:

Step S1-5-1: It is decided whether or not the C-1 oil pressure $P_{C1}$ has reached a minimum pressure necessary for applying the first clutch C1, i.e., a constant PFC1. The subroutine advances to Step S1-S-2, if the C-1 oil pressure $P_{C1}$ is over the constant PFC1, but is ended if NOT. As a matter of fact, however, the C-1 oil pressure $P_{C1}$ is not compared with the constant PFC1, but, rather, a signal SLT fed to the linear solenoid valve 66 (FIG. 4) is compared with a signal SLT.

Step S1-5-2: It is decided whether or not the oil temperature $t_m$ has reached a minimum temperature (e.g., 10° C.) necessary for the fail check, i.e., a constant OT. The subroutine advances to Step S1-5-3, if the oil temperature $t_m$ is over the constant OT, but is ended if NOT.

Incidentally, if the oil temperature $t_m$ is below the constant OT, the responsiveness of the oil drops so that the clutch input side R.P.M. $N_{C1}$ cannot be accurately detected. This may cause an error in the fail check. Therefore, the fail check is not executed if the oil temperature $t_m$ is below the constant OT.

Step S1-5-3: The first fail check timer starts its timing operation.

Figure 26:
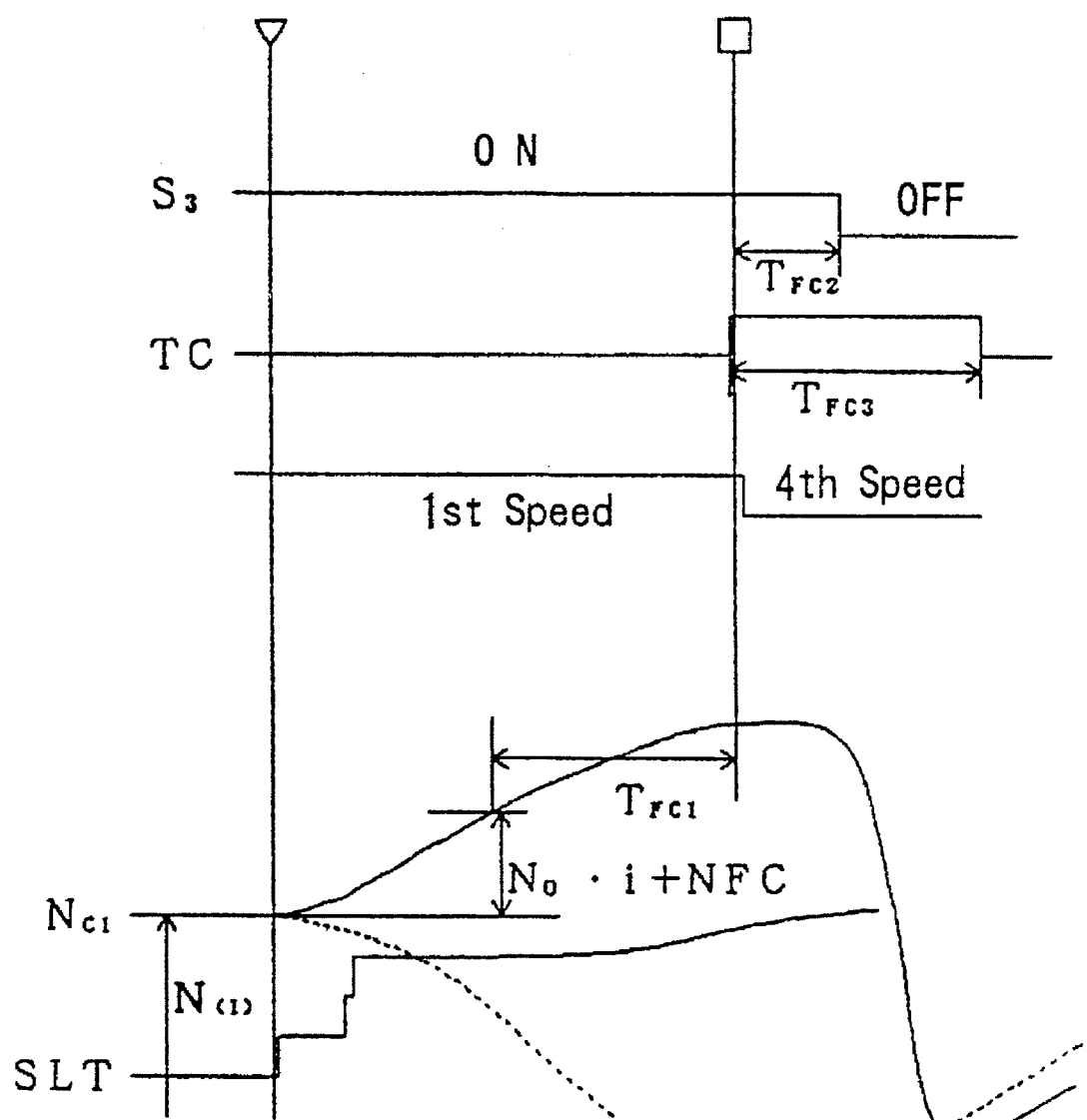
FIG. 26 is a time chart for the first fail check subroutine.

Step S1-5-4: In the aforementioned N-D change control, the signal SLT is fed to the solenoid of the linear solenoid valve 66 to sweep up the C-1 oil pressure $P_{C1}$. As a result, the first clutch C1 is applied as the C-1 oil pressure $P_{C1}$ rises, so that the clutch input side R.P.M. $N_{C1}$ gradually drops, as indicated by a broken curve of FIG. 26. Incidentally, if C-1 control valve 67 (FIG. 5) in the hydraulic control unit 40 (FIG. 1) becomes stuck for some reason, this C-1 control valve 67 may fail to generate the C-1 oil pressure $P_{C1}$, thereby establishing a fail state. In this case, the actual C-1 oil pressure $P_{C1}$ cannot be swept up.

The clutch input side R.P.M. $N_{C1}$ increases, as indicated by a solid curve in FIG. 26, if the accelerator pedal is depressed by the driver.

Therefore, the fail decision is made if the clutch input/output R.P.M. difference, as obtained from the clutch input side R.P.M. $N_{C1}$ and the output side R.P.M. (as will be called the "clutch output side R.P.M.") of the first clutch C1, is higher than a set value which is set on the basis of the clutch input/output R.P.M. difference when the N-D change is detected by the range changing operation detection means (i.e., at the start of the clutch application control when the starting operation is detected by the starting operation detection means 111 in the subroutine of the first fail check of Step 2-3-3 of FIG. 21 for neutral control).

For these operations, the first R.P.M. detection means 101, i.e., the R.P.M. sensor 47, detects the clutch input side R.P.M. $N_{C1}$, and the second R.P.M. detection means 102 detects the clutch output side R.P.M. ($N_0 \bullet i$) on the basis of the output R.P.M. $N_O$ of the speed change unit 16 and the gear ratio i which is established in the speed change unit 16.

Moreover, the fail decision means 119 decides from the following inequality whether or not the present clutch input/ output R.P.M. difference is over a set value:

$$N_{C_1} - N_0 \bullet i \geq N_{(1)} + NFC.$$

The subroutine advances to Step S1-5-5, if the present clutch input/output R.P.M. difference exceeds the set value, but is ended if NOT.

Here, $N_{C_1} - N_0 \bullet i$ is the present clutch input/output R.P.M. difference. In this case, the 1st speed is established in the N-D change control by the speed change unit 16. Therefore, the gear ratio i is established in the 1st speed (although the 2nd speed is established by the speed change unit 16 in the first fail check subroutine of Step S2-3-3 of FIG. 21 for the neutral control, because the hill-hold control is executed before the starting operation is detected by the starting operation detection means 111).

On the other hand, the sum ($N_{(1)}$+NFC) represents a set value based on the clutch input/output R.P.M. difference when the N-D change is detected by the range changing detection means (although in the neutral control, when the starting operation is detected by the starting operation detection means 111). Since the vehicle is at a standstill when the N-D change is detected by the range changing operation detection means (i.e., when the starting operation is detected by the starting operation detection means 111), the output R.P.M. $N_O$ is 0, and the clutch input/output R.P.M. difference is expressed:

$$N_{(1)} - 0 = N_{(1)}.$$

When no failure occurs and there is no delay in the application of the first clutch C1, this application of the first clutch C1 is started as the C-1 oil pressure $P_{C_1}$ rises, so that the clutch input/output R.P.M. difference always decreases.

In the case of a failure, on the contrary, the first clutch C1 is not applied and thus the clutch input/output R.P.M. difference is not increased, even if the accelerator pedal is depressed to raise the engine R.P.M. $N_E$.

Therefore, the present clutch input/output R.P.M. difference is compared with the clutch input/output R.P.M. difference at the instant when the N-D change is detected by the range changing operation detection means (that is, when the starting operation is detected by the starting operation detection means 111).

As a result, even if the engine R.P.M. $N_E$ rises, it is possible to reliably detect the state in which the first clutch C1 cannot be applied, so that the fail decision can be accurately made.

Incidentally, the fail state is not set. However, if the engagement of the first clutch C1 is delayed due to the delay of the rise of the C-1 oil pressure $P_{C_1}$, the engine races slightly so that the clutch input side R.P.M. $N_{C_1}$ and, accordingly, the clutch input/output R.P.M. difference increase. Therefore, the aforementioned set value is the sum of (1) $N_{(1)}$—the clutch input/output R.P.M. difference at the time when the N-D change is detected by the range changing operation detection means (that is, when the starting operation is detected by the starting operation detection means 11) and (2) the safety value NFC for preventing the erroneous decision of occurrence of the failure state.

In the present embodiment, moreover, the vehicle speed sensor 51, located at the output side of the speed change unit 16, is used so that the second R.P.M. detection means 102 determines the clutch output side R.P.M. on the basis of the output R.P.M. $N_O$ detected by the vehicle speed sensor 51 and the gear ratio i. As a result, no special sensor need be provided at the output side of the first clutch C1 so that the cost can be lowered.

In this case, the second R.P.M. detection means 102 is an algorithm in the automatic transmission control system 40 but could be a sensor adjacent the rotating member at the output side of the first clutch C1.

Step S1-5-5: It is decided whether or not a time period $T_{FC1}$ measured by the first fail check timer has elapsed. The subroutine advances to Step S1-5-6, if the time period $T_{FC1}$ has elapsed, but returns to Step S1-5-4, if NOT.

Step S1-5-6: The fail decision means 118 (FIG. 1) decides that a failure has occurred.

Step S1-5-7: The engine torque control means turns ON an engine torque reduction signal TC, as the engine torque control signal, to reduce the rate of fuel injection to the engine 10 and accordingly reduce the engine torque to thereby reduce the engaging shock which is generated when the first clutch C1 is applied. Incidentally, the reduction of the engine torque can be by reducing the rate of fuel injection to the engine 10, by angularly delaying the ignition timing of the engine 10, by interrupting the fuel injection within the range of fuel injection for the engine 10 to maintain the idling R.P.M., or by clocking the sub-throttle valve.

Step S1-5-8: The shift output generating means 115 generates the 4th speed shift output signal to reduce the torque output from the speed change unit 16, to thereby reduce the engaging-shock which is caused when the first clutch C1 is applied.

Incidentally, even if the vehicle is started, the 4th speed shift output is maintained until the intrinsic running state of the 4th speed is established, and then the gear stage is set according to the running state of the vehicle.

Step S1-5-9: The timing operations of the second fail check timer and a third fail check timer are started.

Step S1-5-10: The subroutine waits until a time period $T_{FC2}$ measured by a second fail check timer has elapsed. This time period $T_{FC2}$ is set by taking into consideration the time period between actual establishment of the 4th speed and generation of the 4th speed shift signal.

Step S1-5-11: The fail-safe means 119 turns OFF the third solenoid signal $S_3$ to switch the neutral relay valve 64 to thereby feed the D-range pressure to the hydraulic servo C-1 to apply the first clutch C1. Thus, the N-D change control (i.e., the neutral control in the first fail check subroutine of Step 2-3-3 of FIG. 21) can be interrupted to start the vehicle.

Step S1-5-12: The subroutine awaits lapse of a time period $T_{FC3}$ measured by the third fail check timer. This time period $T_{FC3}$ is set by taking into consideration the time required to actually establish the 4th speed after the 4th speed shift output has been generated, and the time required to actually apply the first clutch after the third solenoid signal $S_3$ has been turned OFF.

Step S1-5-13: The engine torque reduction signal TC is turned OFF.

Step S1-5-14: The pressure boost inhibition means inhibits the N-D change control, and the pressure reduction inhibition means inhibits the neutral control.

Figure 27:
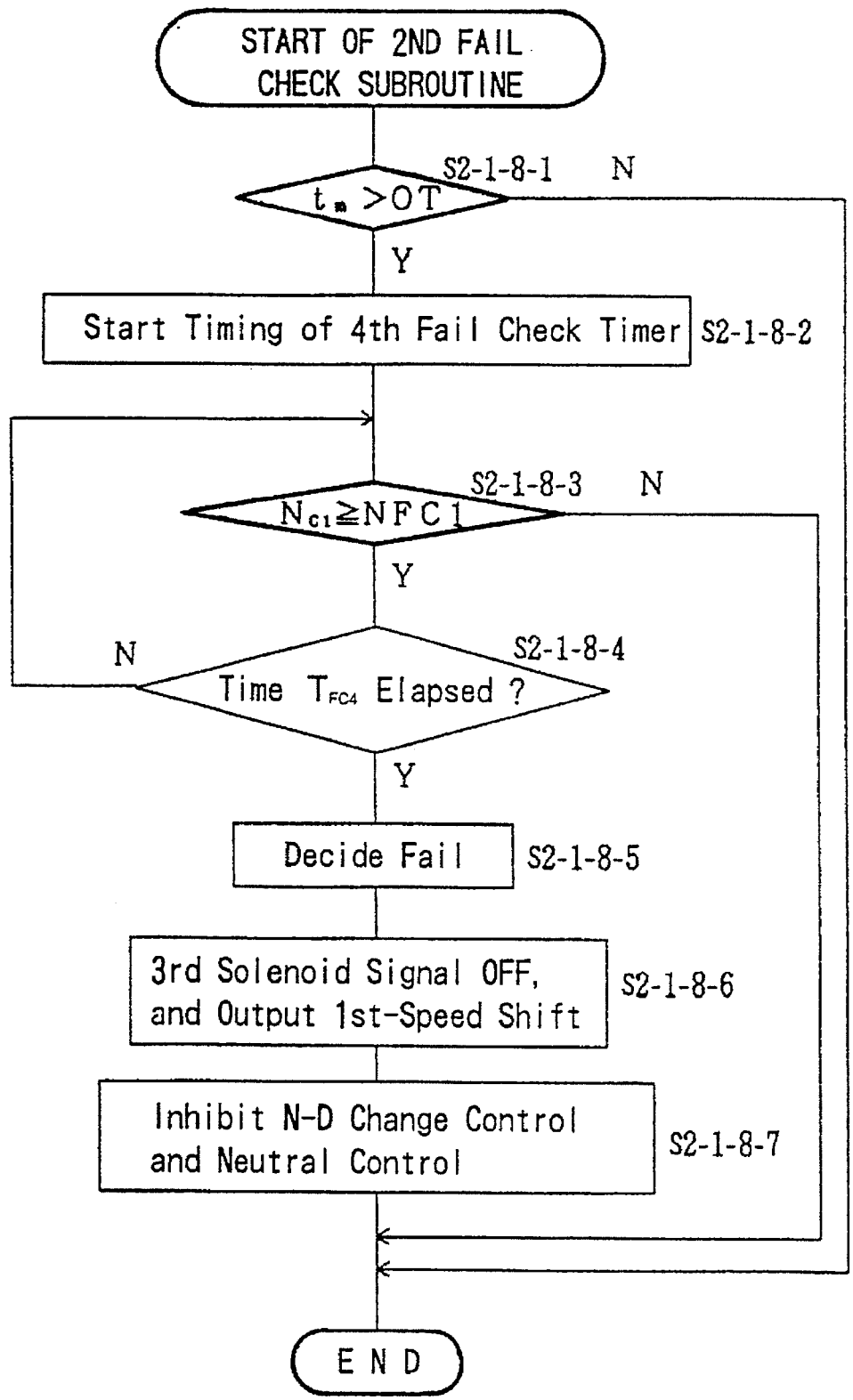
FIG. 27 is a flow chart of a second fail check subroutine.
Figure 28:
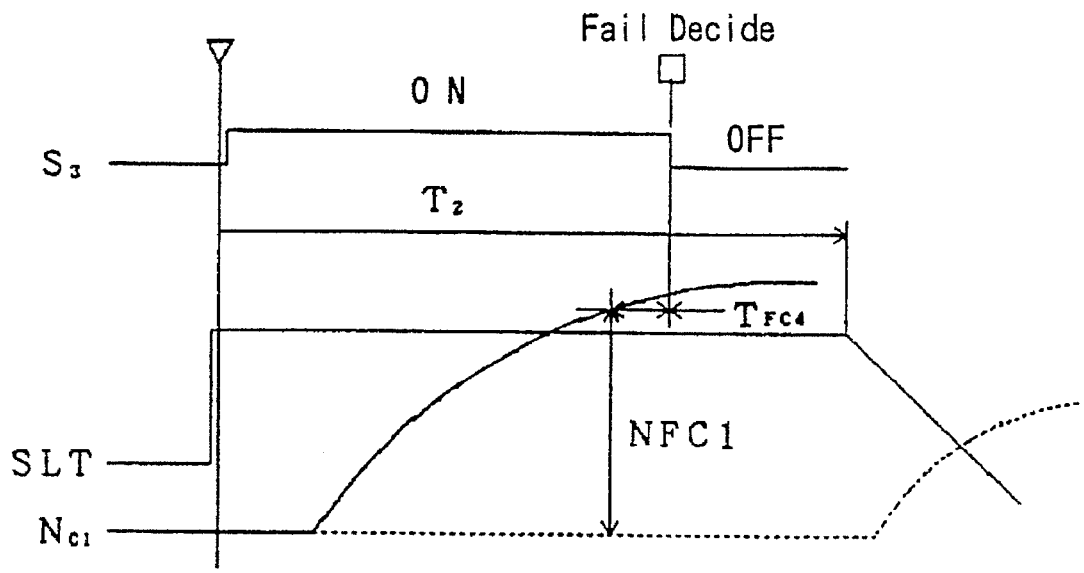
FIG. 28 is a time chart for the second fail check subroutine.

Next, the second fail check subroutine of Step S2-1-8 of FIG. 14 will be described with reference to the flow chart of FIG. 27 and the time chart of FIG. 28. This second fail check subroutine is repeated until the time period $T_2$ measured by the timer has elapsed at Step 2-1-9 of FIG. 14. In the subroutine illustrated in FIG. 27:

Step S2-1-8-1: It is decided whether or not the oil temperature $t_m$ is higher than the constant OT (e.g., 20° C.). The subroutine advances to Step S2-1-8-2, if the oil temperature $t_m$ is higher than the constant OT, but is ended if the oil temperature $t_m$ is lower than the constant OT.

Step S2-1-8-2: The timing operation of a fourth fail check timer is started.

Step S2-1-8-3: In the first clutch release control subroutine of FIG. 13, the C-1 oil pressure $P_{C1}$ corresponding to the engine R.P.M. $N_E$ is generated at Step 2-1-7. After this, the signal SLT is sent to the solenoid of the linear solenoid valve 66 (FIG. 4) to sweep down the C-1 oil pressure $P_{C1}$. As a result, the clutch input side R.P.M. $N_{C1}$ is at 0 when the C-1 oil pressure $P_{C1}$ corresponding to the engine R.P.M. $N_E$ is generated, as indicated by a broken curve of FIG. 28, but is then increased according to the sweep-down of the C-1 oil pressure $P_{C1}$.

In the hydraulic control unit 40 (FIG. 1), if the C-1 control valve 67 (FIG. 5) sticks for any reason, for example, there may occur a failure in which the C-1 oil pressure $P_{C1}$ is not generated in the C-1 control valve 67. In this case, the actual C1 oil pressure $P_{C1}$ cannot to correspond the engine R.P.M. $N_E$. As a result, even if the C-1 oil pressure $P_{C1}$ just before that corresponding to the engine R.P.M. $N_E$ is generated at Step S2-1-7, the release of the first clutch C1 is started so that the clutch input side R.P.M. $N_{C1}$ increases, as indicated by a solid curve in FIG. 28.

It is, therefore, decided whether or not the clutch input side R.P.M. $N_{C1}$ is higher than a constant NFC1 (e.g., 400 rpm). The subroutine advances to Step S2-1-8-4, if the clutch input side R.P.M. $N_{C1}$ exceeds the constant NC1, but is ended if NOT.

Step S2-1-8-4: It is decided whether or not a time period $T_{FC4}$ measured by the fourth fail check timer has elapsed. The subroutine advances to Step S2-1-8-5, if the time period $T_{FC4}$ has elapsed, but returns to Step S2-1-8-3 if NOT.

Step S2-1-8-5: The fail decision means 118 decides occurrence of the fail state.

Step S2-1-8-6: The fail-safe decision 119 turns OFF the third solenoid signal $S_3$ to switch the neutral relay valve 64 and to cause the shift output generating means 115 to generate the 1st speed shift output so that the D-range pressure is fed to the hydraulic servo C-1 to apply the first clutch C1. Thus, the neutral control is interrupted.

Step S2-1-8-7: From this step on, the N-D change control and the neutral control are inhibited.

Figure 29:
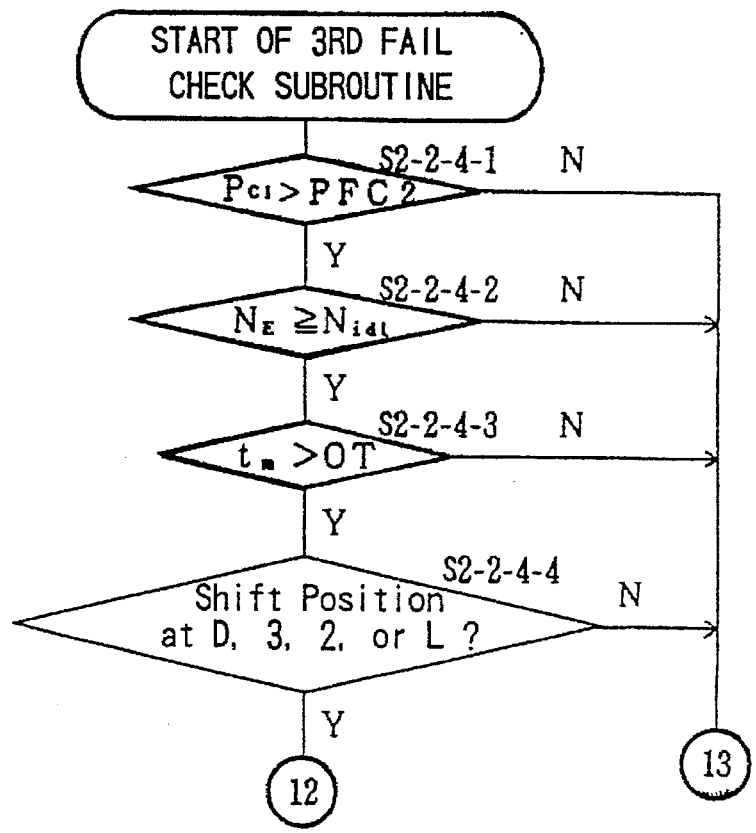
FIG. 29 is a flow chart of a third fail check subroutine.
Figure 30:
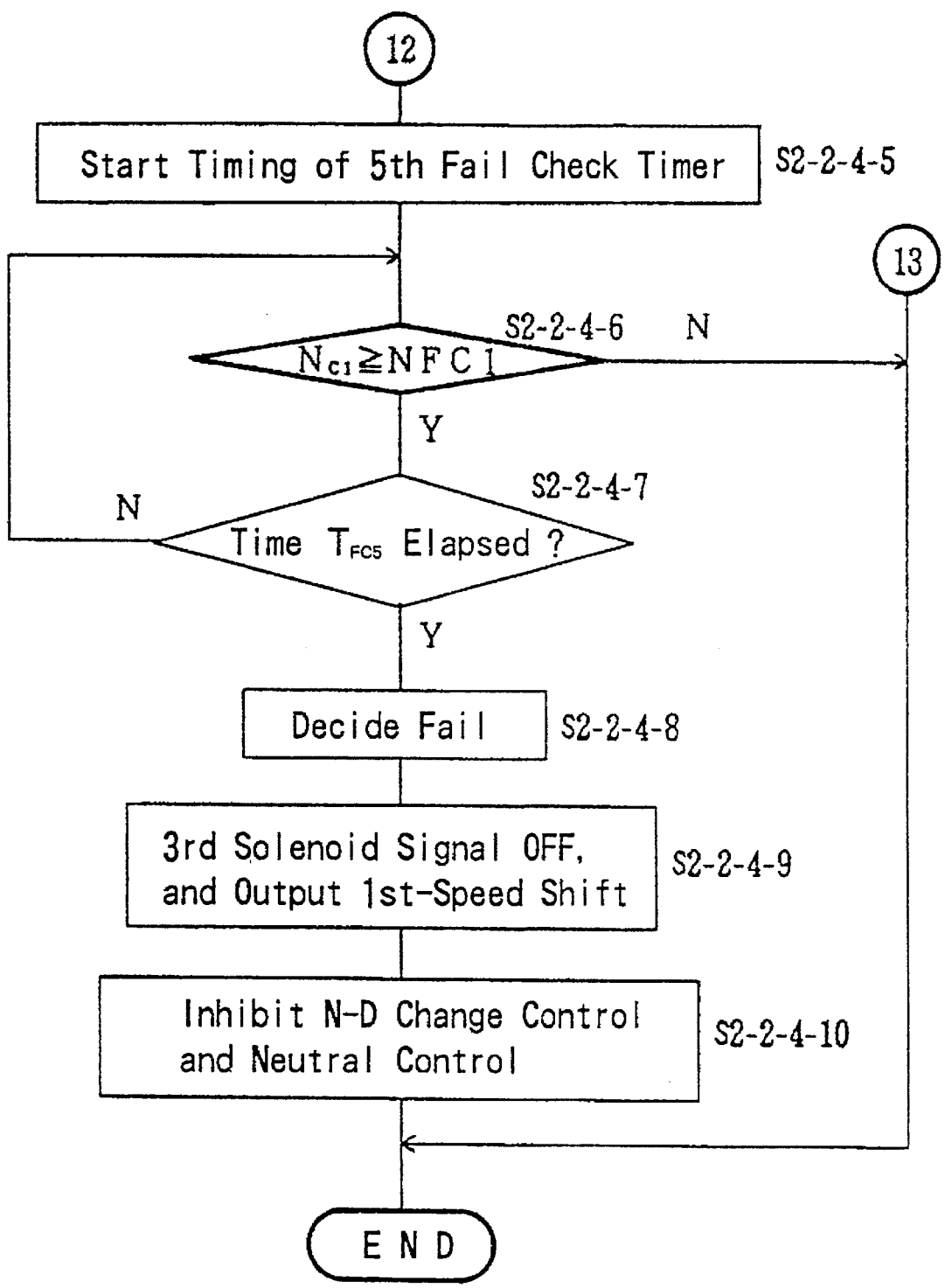
FIG. 30 is a continuation of the flow chart of the third fail check subroutine of FIG. 29.
Figure 31:
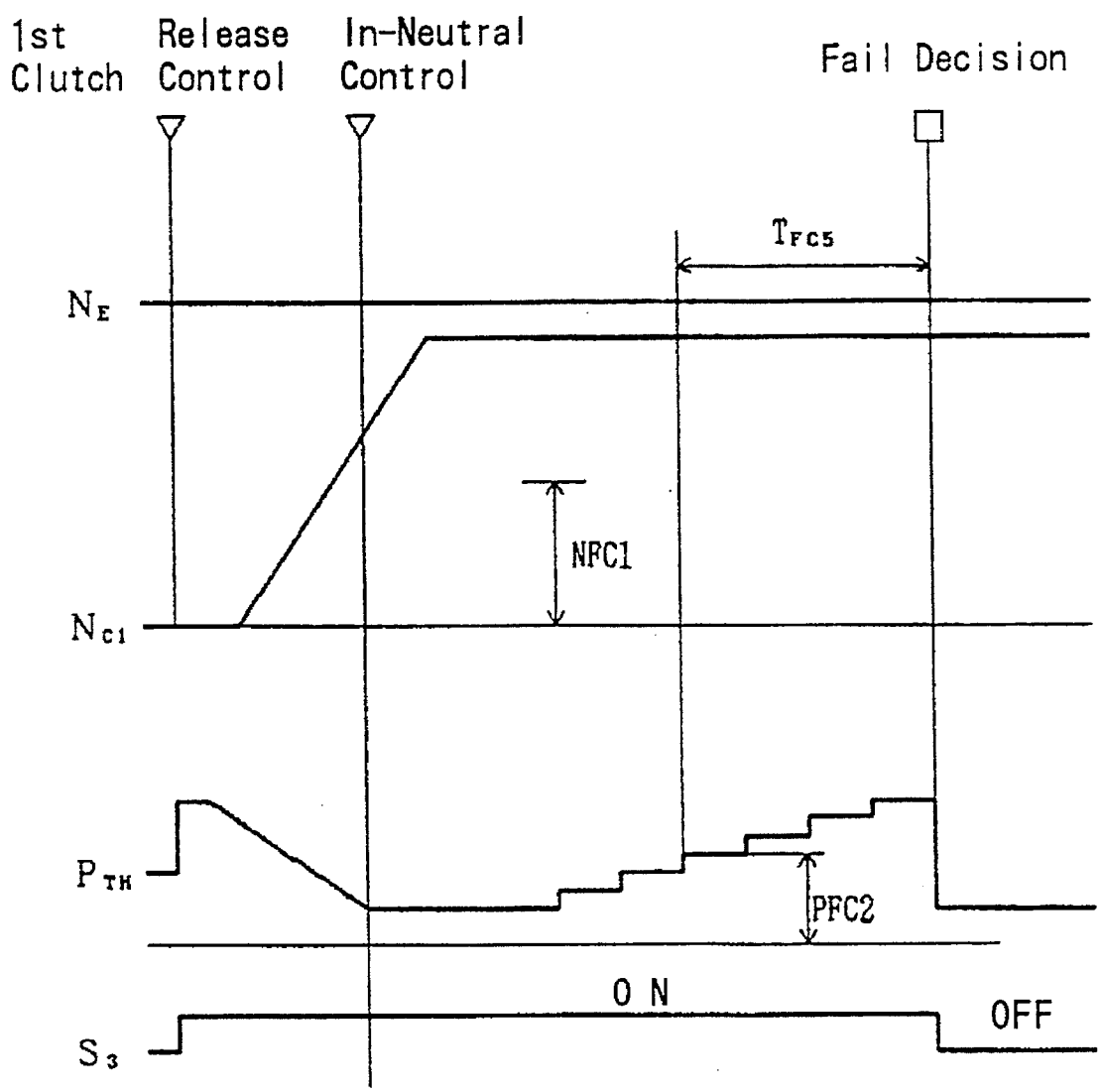
FIG. 31 is a time chart for the third fail check subroutine.
Figure 32:
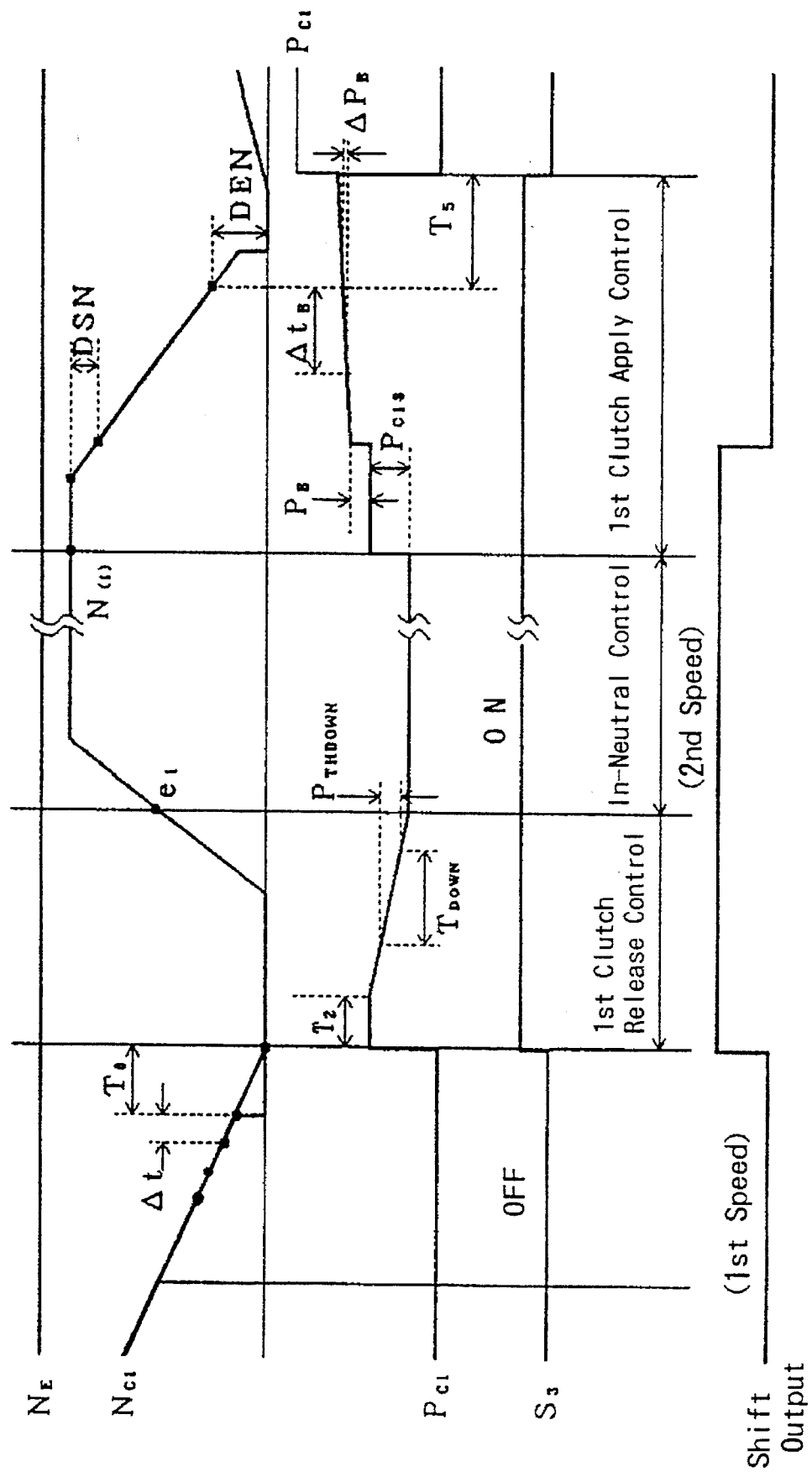
FIG. 32 is a time chart of operation of an automatic transmission control unit in an embodiment of the present invention.

Next, the third fail check subroutine of the Step S2-2-2-4 of FIG. 17 will be described with reference of the flow charts of FIGS. 29 and 30 and the time chart of FIG. 31. In FIGS. 29 and 30:

Step S2-2-4-1: In the in-neutral control subroutine of FIG. 17, if it is decided at Step S2-2-9 that the first clutch C1 is inactive, the signal SLT is sent to the solenoid of the linear solenoid valve 66 (FIG. 4) to boost the throttle pressure $P_{TH}$ as shown in FIG. 31.

In the hydraulic control unit 40 (FIG. 1), if the C-1 control valve 67 (FIG. 5) sticks for any reason, for example, a failure may occur in which the C-1 oil pressure $P_{C1}$ is not generated in the C-1 control valve 67, despite the throttle pressure $P_{TH}$ being generated by the linear solenoid valve 66. In this case, the actual C-1 oil pressure $P_{C1}$ cannot be boosted. As a result, the engagement of the first clutch C1 is not started even if the C-1 oil pressure $P_{C1}$ is boosted, so that the clutch input side R.P.M. $N_{C1}$ remains high, as illustrated in FIG. 31.

In order to decide whether or not the first clutch C1 is active, therefore, it is decided if the C-1 oil pressure $P_{C1}$ is higher than a constant PFC2. The subroutine advances to Step S2-2-4-2, if the C-1 oil pressure $P_{C1}$ is over the constant PFC2, but is ended if NOT. In this case, the constant PFC2 is set to such a value as to imply that the first clutch C1 is active. As a matter of fact, however, the C-1 oil pressure $P_{C1}$ and the constant PFC2 are not compared but, rather, but the signal SLT fed to the linear solenoid valve 66 and the set value are compared.

Step S2-2-4-2: It is decided whether or not the engine R.P.M. $N_E$ is higher than an idling R.P.M. $N_{idl}$. The subroutine advances to Step S2-2-4-3, if the engine R.P.M. $t_m$ is over the idling value OT, but is ended if NOT.

Step S2-2-4-3: It is decided whether or not the oil temperature $t_m$ is higher than the constant OT. The subroutine advances to Step S2-2-4-4, if the oil temperature $t_m$ is over the constant OT, but is ended if NOT.

Step S2-2-4-4: It is decided whether or not the shift position is at any of the D, 3, 2 and L positions. The subroutine advances to Step S2-2-4-5, if the shift position is at any of the D, 3, 2 and L positions, but is ended if NOT.

Step S2-2-4-5: The timing operation of a fifth fail check timer is started.

Step S2-2-4-6: If the C-1 control valve 67 sticks for any reason, as described above, the fail state may arise in which the C-1 oil pressure $P_{C1}$ is not generated in the C-1 control valve 67. In this case, the actual C-1 oil pressure $P_{C1}$ cannot be boosted so that the clutch input side R.P.M. $N_{C1}$ does not decrease. It is, therefore, decided whether or not the clutch input side R.P.M. $N_{C1}$ is higher than the constant NFC1 (e.g., 400 rpm). The subroutine advances to Step S2-2-4-7, if the clutch input side R.P.M. $N_{C1}$ is over the constant NPC1, but is ended if NOT.

Step S2-2-4-7: It is decided whether or not a time period $T_{FCS}$ has elapsed. The subroutine advances to Step S2-2-4-8, if the time period $T_{FCS}$ has elapsed, but returns to Step S2-2-4-6 if NOT.

Step S2-2-4-8: The fail decision means 118 (FIG. 1) decides if a fail state exists.

Step S2-2-4-9: The fail-safe means 119 turns OFF the third solenoid signal $S_3$ to switch the neutral relay valve 64 and to cause the shift output generating means 115 to generate the 1st speed shift output so that the D-Range pressure is fed to the hydraulic servo C-1 to apply the first clutch C1. Thus, the neutral control is interrupted.

Step S2-2-4-10: From now on, the N-D change control and the neutral control are inhibited.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A control system for an automatic transmission in a vehicle including a fluid transmission unit for receiving rotation from an engine and a speed change unit with an input clutch which is applied when a forward running range is selected and which has an input side for receipt of rotational input from the fluid transmission unit and an output side for rotational output to the speed change unit, said control system comprising:

first R.P.M. detection means for detecting R.P.M. of the clutch input side;

second R.P.M. detection means for detecting R.P.M. of the clutch output side;

stop state detection means for detecting if the vehicle is at a standstill;

starting operation detection means for detecting a starting operation by a driver for starting the vehicle in motion;

a hydraulic control unit for establishing any one of a plurality of gear stages in said speed change unit, said hydraulic control unit including:

a hydraulic servo for applying/releasing the input clutch;

a source of oil pressure and a primary valve for regulating the oil pressure from said source to generate a forward running range pressure;

a control signal oil pressure generating solenoid valve for generating a control signal oil pressure;

a control valve for regulating the forward running range pressure according to the control signal oil pressure to generate a control oil pressure;

a change signal oil pressure generating solenoid valve for generating a change signal oil pressure; and a change-over valve switchable by said change signal oil pressure between a first position wherein said changeover valve feeds the forward running range pressure to said hydraulic servo and a second position wherein said change-over valve feeds the control oil pressure to said hydraulic servo; and a control unit including:

shift output generating means for generating a shift output to achieve one of said plurality of gear stages;

pressure reducing means for outputting, when standstill is detected by said stop state detection means, a change signal to the solenoid of said change signal oil pressure generating solenoid valve, to bring said change-over valve into the second position, and a control signal to the solenoid of said control signal oil pressure generating solenoid valve to reduce the control oil pressure and to thereby bring said input clutch into a predetermined state of release;

pressure boosting means for outputting, when a starting operation is detected by said starting operation detection means, a control signal to the solenoid of said control signal oil pressure generating solenoid valve to boost the control oil pressure and to thereby bring said input clutch into a predetermined applied state, and for outputting, when said input clutch comes into a predetermined applied state, a change signal to the solenoid of said change signal oil pressure generating solenoid valve to bring said change-over valve into the first position;

fail decision means for deciding a failure if the clutch input/output R.P.M. difference between the R.P.M. of the input side and the R.P.M. of the output side of said input clutch is over a set value which is set on the basis of the clutch input/output R.P.M. difference when the starting operation is detected by said starting operation detection means; and fail-safe means for causing said shift output generating means to generate a shift output to a higher speed gear stage, over-riding any control signal from said pressure boosting means, when a failure is decided by said fail decision means, and for outputting a change signal to the solenoid of said control signal oil pressure solenoid valve to thereby bring said change-over valve into the first position when a failure is decided by said fail decision means.

2. A control system for an automatic transmission in a vehicle including a fluid transmission unit for receiving rotation from an engine and a speed change unit with an input clutch which is applied when a forward running range is selected and which has an input side for receipt of rotational input from the fluid transmission unit and an output side for rotational output to the speed change unit, said control system comprising:

first R.P.M. detection means for detecting R.P.M. of the clutch input side;

second R.P.M. detection means for detecting R.P.M. of the clutch output side;

range changing operation detection means for detecting a range changing operation for change of the forward running range;

a hydraulic control unit for establishing any one of a plurality of gear stages in said speed change unit, said hydraulic control unit including:

a hydraulic servo for applying/releasing the input clutch;

a source of oil pressure and a primary valve for regulating the oil pressure from said source to generate a forward running range pressure;

a control signal oil pressure generating solenoid valve for generating a control signal oil pressure;

a control valve for regulating the forward running range pressure according to the control signal oil pressure to generate a control oil pressure;

a change signal oil pressure generating solenoid valve for generating a change signal oil pressure; and a change-over valve switchable by said change signal oil pressure between a first position wherein said change-over valve feeds the forward running range pressure to said hydraulic servo and a second position wherein said change-over valve feeds the control oil pressure to said hydraulic servo; and a control unit including:

shift output generating means for generating a shift output to achieve one of said plurality of gear stages;

pressure boosting means for outputting, when a changing operation is detected by said range changing operation detection means, a change signal to the solenoid of said change signal oil pressure generating solenoid valve to bring said change-over valve into the second position, for then outputting a control signal to the solenoid of said control signal oil pressure generating solenoid valve to boost the control oil pressure to thereby bring said input clutch into a predetermined applied state, and for outputting, when said input clutch comes into said predetermined applied state, a change signal to the solenoid of said change signal oil pressure generating solenoid valve to bring said change-over valve into the first position;

fail decision means for deciding a failure if the clutch input/output R.P.M. difference between the R.P.M. of the input side and the R.P.M. of the output side of said input clutch is over a set value which is set on the basis of the clutch input/output R.P.M. difference when a range changing operation is detected by said range changing operation detection means; and fail-safe means for causing said shift output generating means to generate a shift output to a higher speed gear stage, over-riding any control signal from said pressure boosting means, when a failure is decided by said fail decision means, and for outputting a change signal to the solenoid of said control signal oil pressure solenoid valve to thereby bring said change-over valve into the first position when a failure is decided by said fail decision means.

3. A control system for an automatic transmission according to claim 1, further comprising:

output R.P.M. detection means for detecting the output R.P.M. of said speed change unit, wherein said second R.P.M. detection means detects the clutch output side R.P.M. on the basis of the output R.P.M. and the gear ratio of the gear state which is achieved by said speed change unit.

4. A control system for an automatic transmission according to claim 1, wherein said control unit further includes engine torque control means for generating an engine torque control signal, when a failure is decided by said fail decision means, to reduce the torque of the engine at least until completion of the application of said input clutch.

5. A control system for an automatic transmission according to claim 1, wherein said fail-safe means causes, when a failure is decided by said fail decision means, said shift output generating means to generate a shift output for shift to a higher gear stage, prior to the output of the control signal by said pressure boosting means, and outputs the change signal, after the shift to the higher gear stage has been achieved, to the solenoid of said change signal oil pressure generating solenoid valve to bring said change-over valve into the first position.

6. A control system for an automatic transmission according to claim 1, wherein control unit further includes pressure reduction inhibition means for inhibiting the outputs of the change signal and the control signal by said pressure reducing means when a failure is decided by said fail decision means.

7. A control system for an automatic transmission according to claim 2, wherein control unit further includes pressure boost inhibition means for inhibiting the outputs of the change signal and the control signal by said pressure boosting means when a failure is decided by said fail decision means.

8. A control system for an automatic transmission according to claim 2, further comprising:

output R.P.M. detection means for detecting the output R.P.M. of said speed change unit, wherein said second R.P.M. detection means detects the clutch output side R.P.M. on the basis of the output R.P.M. and the gear ratio of the gear stage which is achieved by said speed change unit.

9. A control system for an automatic transmission according to claim 2, wherein said control unit further includes engine torque control means for generating an engine torque control signal, when a failure is decided by said fail decision means, to reduce the torque of the engine at least until completion of the application of said input clutch.

10. A control system for an automatic transmission according to claim 2, wherein said fail-safe means causes, when a failure is decided by said fail decision means, said shift output generating means to generate a shift output for shift to a higher gear stage, prior to the output of the control signal by said pressure boosting means, and outputs the change signal, after the shift to the higher gear stage has been achieved, to the solenoid of said change signal oil pressure generating solenoid valve to bring said change-over valve into the first position.

* * * * *

UNITED STATES PATENT AND TRADEMARK OFFICE
CERTIFICATE OF CORRECTION

PATENT NO. : 5,649,880
DATED : July 22, 1997
INVENTOR(S) :
TSUTSUI et al

It is certified that error appears in the above-indentified patent and that said Letters Patent is hereby corrected as shown below:

Col. 17, line 18, "$M_{Em}$" should read --$N_{Em}$--;
        line 56, after "period" insert --$\Delta t$--; and
        line 64, after "period" insert --$\Delta t$--.

Col. 22, line 20, "Step S1-S-2" should read --Step S1-5-2--.

Col. 26, line 13, do not begin a new paragraph after "to";
        line 14, "$t_m$" should read --$N_E$--;
        line 15, "OT" should read --$N_{idl}$--; and
        line 35, "NPC1" should read --NFC1--.

Signed and Sealed this

Eighteenth Day of August, 1998

Attest:

BRUCE LEHMAN

Attesting Officer      Commissioner of Patents and Trademarks